United States Patent [19]

Baji et al.

[11] Patent Number: 5,091,864
[45] Date of Patent: Feb. 25, 1992

[54] SYSTOLIC PROCESSOR ELEMENTS FOR A NEURAL NETWORK

[75] Inventors: Toru Baji, Burlingame, Calif.; Hidenori Inouchi, Donnybrook, Ireland

[73] Assignee: Hitachi, Ltd., Tokyo, Japan

[21] Appl. No.: 455,141

[22] Filed: Dec. 21, 1989

[30] Foreign Application Priority Data

Dec. 23, 1988 [JP] Japan ............................. 63-323302

[51] Int. Cl.$^5$ .......................................... G06F 15/18
[52] U.S. Cl. .................................................... 395/27
[58] Field of Search ................ 364/513, 807; 307/201

[56] References Cited

U.S. PATENT DOCUMENTS

4,953,099 8/1990 Jourjine ............................. 364/513
4,967,369 10/1990 Jourjine ............................. 364/513

OTHER PUBLICATIONS

A Universal Digital VLSI Design for Neural Networks; H. C. Fu et al.; Inter. Joint Conf. on Neural Networks—IJCNN; Jun. 19–22, 1989.
Koike, et al., "Special Purpose Machines for Neurocomputing", vol. 29, No. 9, Sep. 1986, pp. 974–983 of the Journal of the Information Pro. Society of Japan.
S. Y. Kung, "Parallel Architectures for Artificial Neural Nets", Digest of the IEEE International Conference on Systolic Arrays, 1988, pp. 163–174.
Massimo A. Sivilotti, et al., "VLSI Architectures for Implementation of Neural Networks", American Institute of Physics, 1986, pp. 408–413.
P. Andrew Penz, et al., "Digital Signal Processor Accelerators for Neural Network Simulations", American Institute of Physics, 1986, pp. 345–355.
Richard P. Lippmann, "An Introduction to Computing with Neural Nets", IEEE ASSP Magazine, Apr. 1987, pp. 4–22.

*Primary Examiner*—Allen R. MacDonald
*Attorney, Agent, or Firm*—Fay, Sharpe, Beall, Fagan, Minnich & McKee

[57] ABSTRACT

A neural net signal processor provided with a single layer neural net constituted of N neuron circuits which sums the results of the multiplication of each of N input signals $Xj(j=1$ to $N)$ by a coefficient $mij$ to produce a multiply-accumulate value $$Si = \sum_{j=1}^{N} mij * Xj$$

thereof, in which input signals $Xj(j=1$ to $N)$ for input to the single layer neural net are input as serial input data, comprising: a multiplicity of systolic processor elements SPE-1($i=1$ to M), each comprised of a two-state input data delay latch; a coefficient memory; means for multiplying and summing for multiply-accumulate output operations; an accumulator; a multiplexor for selecting a preceding stage multiply-accumulate output $Sk(k=1$ to $i-1)$ and the multiply-accumulate product $Si$ computed by the said circuit; wherein the multiplicity of systolic processor elements are serially connected to form an element array and element multiply-accumulate output operations are executed sequentially to obtain the serial multiply-accumulate outputs $Si(i=1$ to $M)$ of one layer from the element array.

17 Claims, 33 Drawing Sheets

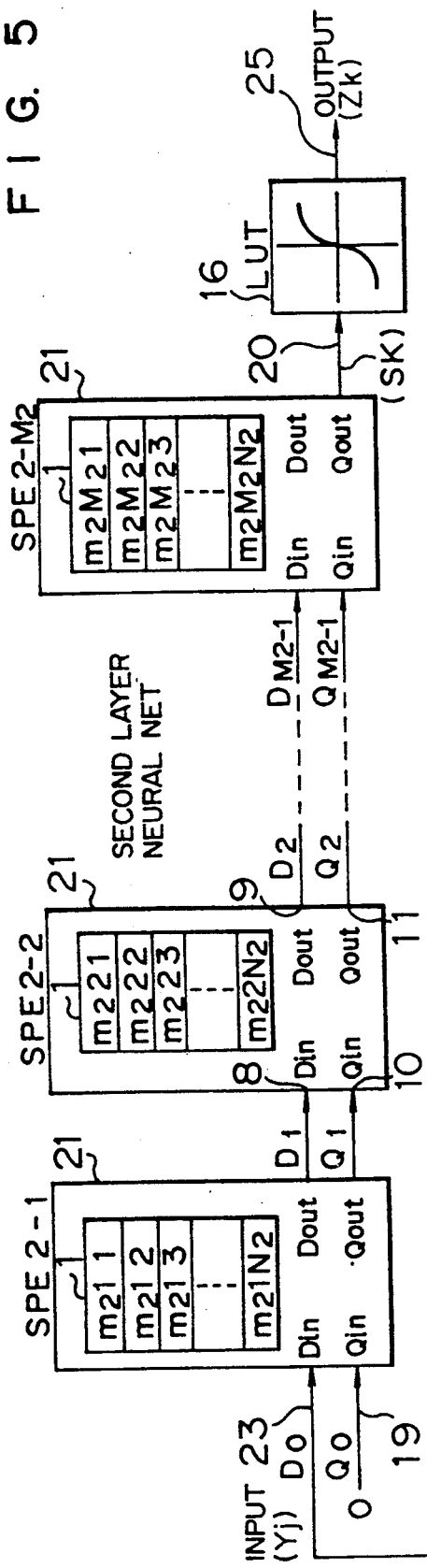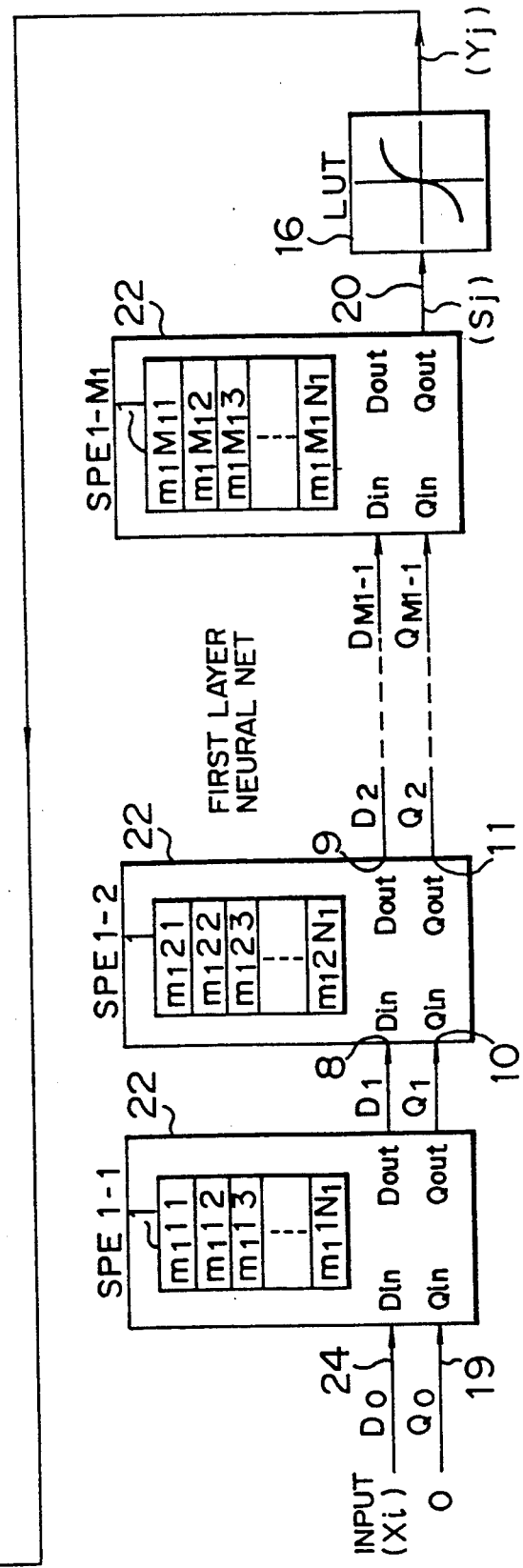
FIG. 5

F I G. 25
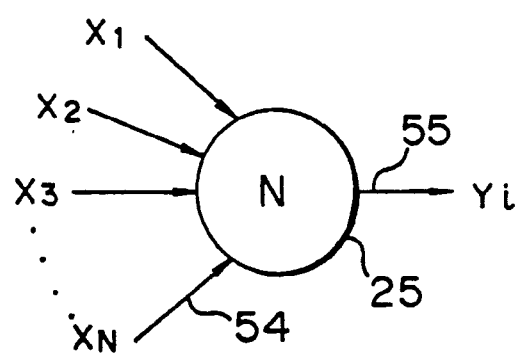

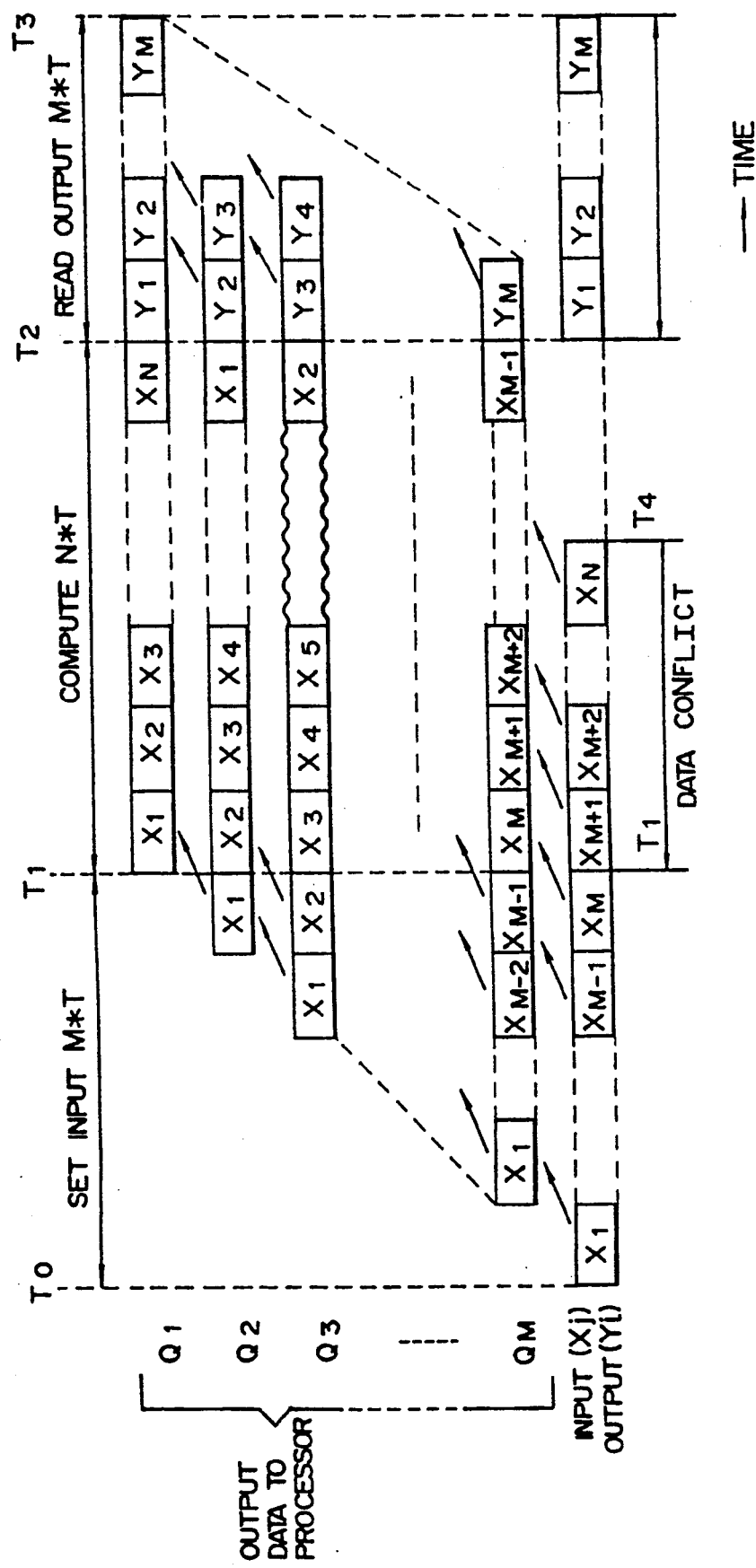
F I G. 29

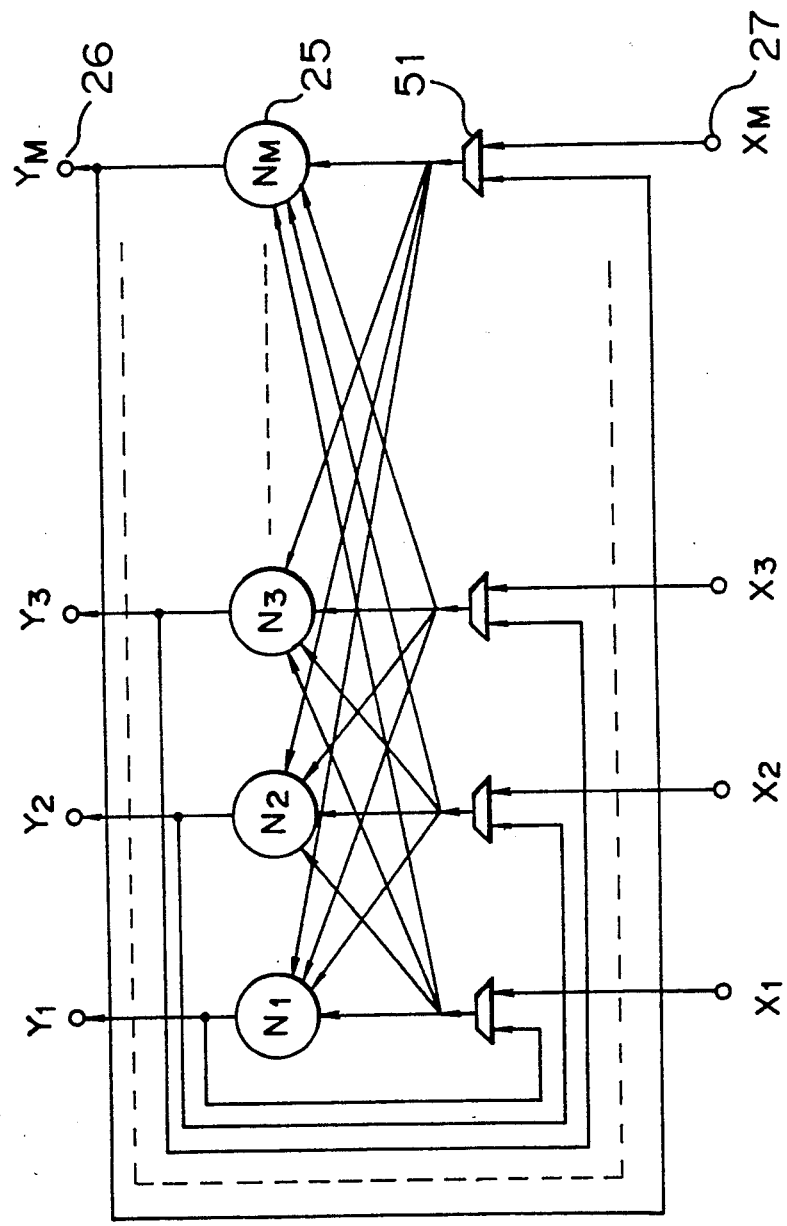
F I G. 32

SYSTOLIC PROCESSOR ELEMENTS FOR A NEURAL NETWORK

BACKGROUND OF THE INVENTION

1. Field of the Invention

The present invention relates to a neural net signal processor, particularly to a neural net LSI (large-scale integration) processor for realizing neuro-computing models based on biological nervous systems. Possible applications for such a processor include fields such as image recognition, speech recognition and speech synthesis in which decisions based on large quantities of input information need to be computed with speed and flexibility.

2. Description of the Prior Art

Examples of the prior art in this field include the following two references.

(1) Koike, et al, "Special Purpose Machines for Neurocomputing", v. 29 No. 9 (September 1988), p 974-983 of Journal of the Information Processing Society of Japan.

(2) S. Y. Kung, "Parallel Architectures for Artificial Neural Nets", Digest of the IEEE International Conference on Systolic Arrays, 1988.

Neural nets consist of simple computing elements interconnected by weighted, directional links into networks for parallel processing of input information. These neural net systems do not use programs such as those used for conventional computers. Instead, neural nets are adapted to the various processing tasks according to a prescribed set of initial values for weights and functions, and in accordance with specific learning rules.

Weights and functions are computed by neural circuits such as the one shown in FIG. 25. A neural net is constituted as an interconnected plurality of these neurons. Inputting N inputs {X1, X2, ... XN} to the circuit produces the output shown by equation (1).

$$Yi = f\left[\sum_{i=1}^{N} mij * Xj\right] \quad (1)$$

Here, coefficient mij is for adding a weight to input Xj, and f( ) is the function applied.

f( ) is a nonlinear function that is important inasmuch as it determines the convergence of the neural net. Generally the sigmoid function shown in equation (2), which is analogous to a biological neuron, is employed.

$$f(u) = 1/(1 + EXP(-u)) \ldots \quad (2)$$

In the case of a single layer neural net, the above neuron is connected as shown in FIG. 26. Use of such neural nets makes image and voice pattern recognition possible. In such applications, the patterns to be matched are established by applying neuron weight coefficients.

Here, each of the inputs X1 to XN is supplied to each of M neurons 25 and Y1 to YM are output in parallel. With this arrangement, each input has to drive M neurons (nodes).

The total number of links NM involved becomes very large. To receive an input pattern comprised of 100 by 100 pixels, for example, and sort it into any of 1,000 categories requires a minimum of N=10,000 input terminals and M=1,000 neurons. And, as each input terminal has to drive 1,000 neurons, a total of million links are required.

The most direct approach to realizing such a neural net is through the use of analog ICs. However, as pointed out in reference (1), with current technology the large numbers of connections involved preclude further increases in density, so one chip can accommodate only several tens or several hundred neurons. This means that, for the above example, at least 10 chips would be required. Propagating analog values between chips with a high level of precision also involves advanced technology.

Weights have to be implemented using resistances or transistor conductance, which makes it difficult to realize neural nets with learning capabilities in which the weight coefficients have to be programmable.

The use of digital circuitry to form neural nets solves the problems of chip-to-chip signal propagation and programmable weights. One neuron can be processed by one computing unit, or a plurality of neurons can be processed by one computing unit using virtual techniques. The former approach involves extensive hardware requirements, as each unit has to be provided with multiply-accumulate arithmetic capabilities and function capabilities, which limits the number of neurons to several tens of thousands.

With the latter approach, hardware is no problem, but having to process a plurality of neurons with a single computing unit results in lower processing rates than those of an analog system. However, as such systems can be adapted to the various neural net configurations merely by reprogramming, nearly all of the digital processing systems currently being proposal adopt this approach.

Owing to the large numbers of node interconnections in a neural net, in both approaches there is a large volume of communication between processors, so the choice of the connection configuration has a major effect on the overall performance of the system.

At present the latter system is implemented using DSPs (digital signal processors) and floating-point arithmetic processors. However, system performance is constrained by the use of standard conventional chips. Even with fifteen M68020 CPUs with their floating-point coprocessors, performance is limited to a maximum of around 500 kilolinks/sec. (One link corresponds to one weight calculation.)

A performance of 8 megalinks/sec can be achieved with the arrangement according to Newman (Reference (1)) in which eight processors are used, but this requires a total of 16 floating-point coprocessors, two for each processor element.

Real-time processing of video signals requires the ability to process 15 frames of information per second, each frame consisting of 512 by 512 pixels for a total of 256,000 pixels. For this, the simple single layer net comprised of M neurons as illustrated in FIG. 26 needs to be capable of a processing speed of 3.8 million megalinks/sec. Even with one hundred neurons a very high-speed capability of 380 megalinks/sec would be required, which is impossible with conventional chips. Even if it were possible, the scale of the circuitry involved would be impractically large.

One solution is the approach of reference (2), which describes the use of a system array. FIG. 27 shows the SPEi unit used to form the array, and FIG. 28 shows an example of the single layer neural nets of FIG. 26 formed using these SPEs.

Each of the SPEs 136 is comprised of a shift register 133 in which coefficients are stored and, after read-out, sequentially moves each data element to the next location in the register; a multiplier 2 for multiplying data input $\{Xj\}$ $(j=1-N)$ by weight coefficient mij; an adder 3 and an accumulator 4 for multiply-accumulate processing of the multiplication products; a nonlinear function generator 135 for applying nonlinear function f() to the multiply-accumulate product (accumulation result) 14; and an I/O multiplexor 134 for outputting the finished multiply-accumulate output of N data inputs to output terminal Qi.

The systolic array single layer neural net illustrated in FIG. 28 is configured by connecting M systolic processor elements 136 to an input data $\{Xj\}$ feedback line 138 which transfers data from the leftmost processor element SPE-1 to the rightmost element SPE-M. Input data 17 is supplied to this feedback line 13B and output data 18 is output from the same feedback line 138. Thus, since other than the feedback line 138 the only connections are those between adjacent processor elements, the number of links is very low and the signal transfer rate is correspondingly high. An outline of the operation of the above circuit in which the number of neurons M of the single layer neural net is equal to the number of data inputs N (in the neural nets of FIG. 26, the number of input terms) will now be described with reference to FIG. 30.

Between times T0 and T1, data $\{Xj\}$ is sequentially input from the left at each system clock. The system clock cycle unit is T (seconds). At each clock unit, data $\{Xj\}$, which has entered each processor element 136 from the right, is transferred to the next processor element to the left. Thus, N * T (seconds) after T0, data has been passed through all of the processor elements and arithmetic operations commence in each element. When there is a means of placing data $\{Xj\}$ in parallel into the processor elements, this data transfer procedure (between T0 and T1) is unnecessary. However, parallel input would require that there by as many links as there are input data elements N, thereby negating the feature of the systolic array, i.e., the low number of links.

Simultaneously with the arithmetic processing, at each clock pulse the input data is transferred to the processor element immediately to the left. From the leftmost processor SPE-1, the data is transferred to the rightmost element SPE-M via the feedback line 138.

As data are input to element SPE-1 in the order X1, X2, X3, ..., coefficients mij are read out of the coefficient shift register 133 in the order mM1, mM2, mM3, ..., . However, as data are input to the second element SPE-2 in the order X2, X3, X4, ..., coefficients mij are read out also in the order m22, m23, m24, ..., m21. The shift register 133 is used to facilitate this coefficient read-out sequence. However, this requires a consideration of the sequence of coefficient read-out between SPEs at the time the coefficients are being set, making the setting procedure troublesome.

With respect to processing speed, for each clock M weight calculations can be performed in parallel. That is, M links can be calculated per clock. With chips fabricated using a 1-micrometer-feature CMOS process, the processors can be operated at a clock speed of about 20 MHz. Some 100 of the processors could be integrated on a chip 10 mm square. A neural net comprised of such chips would be capable of processing at a rate of 2,000 megalinks per second, which is fast enough to process images and other such high-speed signals on a real-time basis.

FIG. 29 illustrates an example of processor operation when the number of data inputs N exceeds the number of processors M. With this arrangement, processing can start at time T1, but if this coincides with an attempt to feed back the data from left to right via the feedback line 138, as there is data XM+1, ..., XN yet to come, there is a data conflict between T1 and T4, which prevents the circuit from operating normally. (There would be no problem if parallel input of $\{xj\}$ to all elements were possible, but this would require an impracticably large number of links.) Moreover (and this also applies to the above arrangement in which M =N), as output data $\{Yi\}$ uses the same signal line 138, while $\{Yi\}$ is being transferred (between T2 and T3) the next data $\{Xj\}$ cannot be input. To summarize, then, with the known systolic array arrangements, high-speed processing of images in real time is possible using parallel processing, and complex neural nets can be configured by linking adjacent processor elements. On the other hand, there is the problem of data conflicts caused by the same signal line being used for input data $\{Xj\}$ and output data $\{Yi\}$, while another problem is that as the read-out sequence of coefficient mij differs from processor to processor, special techniques are needed when setting coefficient values. In addition, the prior art examples do not mention extending the application to include ordinary neural nets, but refer only to Hopfield and back-propagation models.

SUMMARY OF THE INVENTION

The objects of the present invention are to overcome the problems of the prior art, as set out below.

(1) Using the prior art (reference (2)), the functionality of nets with complex interconnection configurations can be realized by linking just adjacent processor elements. However, since the one line is used for both data input and data output, data input cannot take place until the output data has been transferred on, so system speed can be limited by transfer rates. Also, owing to data contention on the data transfer channel, such an arrangement cannot be applied without modification when the number of data inputs N exceeds the number of processors M. Therefore a first object of the present invention is to provide a more general purpose, high-speed, large-scale neural net that enables high-speed data transfer to take place by avoiding conflicts between data on the data transfer channel and which is not constrained by the number of data inputs N or processors M.

(2) In the arrangement of reference (2), a feedback line 138 (FIG. 28) is required to feed back data from the first to the last processor element. When the neural net concerned is large, however, it is difficult to synchronize processor elements which are thus separated by such a distance. Therefore, a second object of the present invention is to provide a neural net signal processor that is applicable to large neural nets and does not use such a feedback line.

(3) In the prior art reference (2), each processor has to be provided with a nonlinear function generator, but in order to operate neurons in an optimized state it is necessary to be able to adjust the nonlinear characteristics. Preferably, it should be possible to change the characteristics on a layer by layer basis rather than on a discrete element by element basis. In the case of the prior-art example of reference (2) the characteristics of all the processor elements have to be reprogrammed, which is time-consuming. Therefore, a third object of the present invention is to enable weight coefficients and nonlinear functions (e.g. sigmoid functions) to be reprogrammed quickly.

(4) Application to Hopfield, multilayer, and back-propagation neural net models requires that the prior-art processor of reference (2) undergoes hardware-based modifications, such as the arrangement of its connecting links. Therefore a fourth object of the invention is to provide a processor that can be reprogrammed to adapt it to each type of neural net rather than through the use of hardware modifications.

(5) In the arrangement of the prior-art reference (2), a multiplier and an adder are required to form one neuron, but for systems where speed is not a priority, such an arrangement is bulky and uneconomic. Therefore a fifth object is to use a minimum of hardware in providing a neuron processor possessing sufficient speed for the system application concerned.

(6) In the arrangement of the prior-art reference (2), the functions of a neural net with an extensive, complex system of interconnections have been realized with a configuration in which the only links are those provided by a single line connecting adjacent processor elements. A negative aspect of this, however, is a loss of redundancy which means that the presence of just one defective element will halt the entire net. Therefore, a sixth object is to provide a processor that can continue to function even if a line breaks or a neuron fails.

The above objects are attained with the neural net signal processor according to the present invention as follows.

(1) The first object is attained by providing a systolic array equipped with separate signal lines for input data and output data.

(2) The second object is attained by a circuit configuration and processing system wherein multiply-accumulate processing of an input data series $\{Xj\}(1 \leq j \leq N)$ starts at the first-stage processor element and proceeds sequentially.

(3) The third object is attained by using a systolic array to perform multiply-accumulate processing by multiplying input data of a single layer neural net with a weight coefficient and accumulating the multiplication result of the individual neurons, and performing nonlinear processing by means of the single nonlinear function look-up table with which each layer is provided. Moreover, a bus is provided that allows the weight coefficient memories and the nonlinear function look-up tables to be accessed by the host CPU, thereby enabling the characteristics thereof to be readily changed.

(4) The fourth object is attained by an arrangement which allows input and output data to bypass processor elements, or for the nonlinear function look-up table to be bypassed, and by making the bypass configuration programmable.

(5) The fifth object is attained by providing each processor element with coefficient memory means for storing the weight coefficients of a plurality of neurons, and means for controlling multiply-accumulate operations of a plurality of neurons, and by using serial multipliers.

(6) The sixth object is attained by the provision of test data generation means and detection means.

(1) Concerning the means for achieving the first object, data conflicts are eliminated by the use of separate lines for input and output data. This also enables higher processing speeds to be attained by, for example, allowing input and output data transfers to proceed in parallel, allowing more general neural nets to be configured that are not constrained with respect to the number of neurons.

(2) The means for achieving the second object eliminates the need for the type of data distribution required for simultaneous start of signal processing by all the processor elements, as in the arrangement of the prior-art reference example (2), and it also eliminates the need to synchronize the first stage and final stage processor elements. This makes the processor of the invention applicable to large neural nets as well. Also, generally the input of one data set $\{Xj\}(1 \leq j \leq N)$ can be followed by the input of the next set $\{X'j\}(1 \leq j \leq N)$ without any pause in processor operation.

(3) With the means for achieving the third object, weight coefficients and nonlinear functions can be reprogrammed via the data bus. Only one look-up table has to be programmed for each layer, which eases the load on the bus, reduces the number of locations that have to be reprogrammed and shortens the time needed to modify processor characteristics.

(4) With respect to the means for achieving the fourth object, the same hardware can be reconfigured as a single layer net, a multilayer net, a feedback net or a clusterized net by programming the signal bypass paths appropriately.

(5) With respect to the means for achieving the third object, being able to use one multiplier-adder set for processing a plurality of neurons is more economic in terms of hardware. Also, the number of neurons processed by one processor can be adjusted (programmed) in accordance with processing speed. Use of serial multipliers can also produce hardware savings, as multiplication can be performed using the adder.

These and other objects and features of the invention will be better understood from the following detailed description made with reference to the drawings.

BRIEF DESCRIPTION OF THE DRAWINGS

FIG. 5 shows a two layer neural net formed using a systolic array according to the invention;

FIG. 25 is a circuit diagram showing the basic function of a conventional neuron;

FIG. 29 is a first timing diagram of the operation of the single layer neural net formed using the conventional systolic processor element of reference (2);

FIG. 32 shows a conventional feedback single layer (or Hopfield) neural net.

DESCRIPTION OF THE PREFERRED EMBODIMENTS

Figure 1:
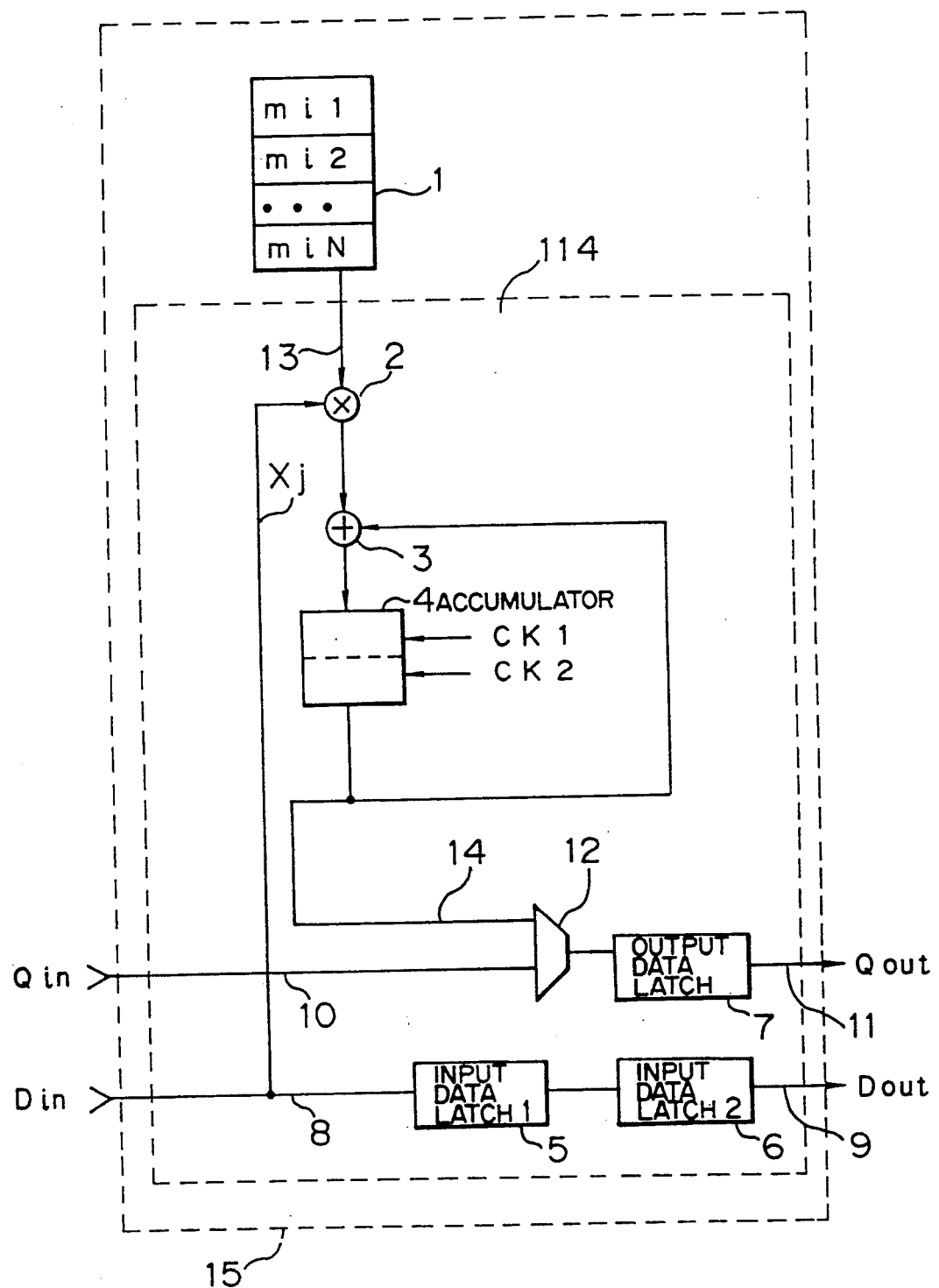
FIG. 1 shows a basic circuit configuration of a systolic processor element according to the present invention.
Figure 2:
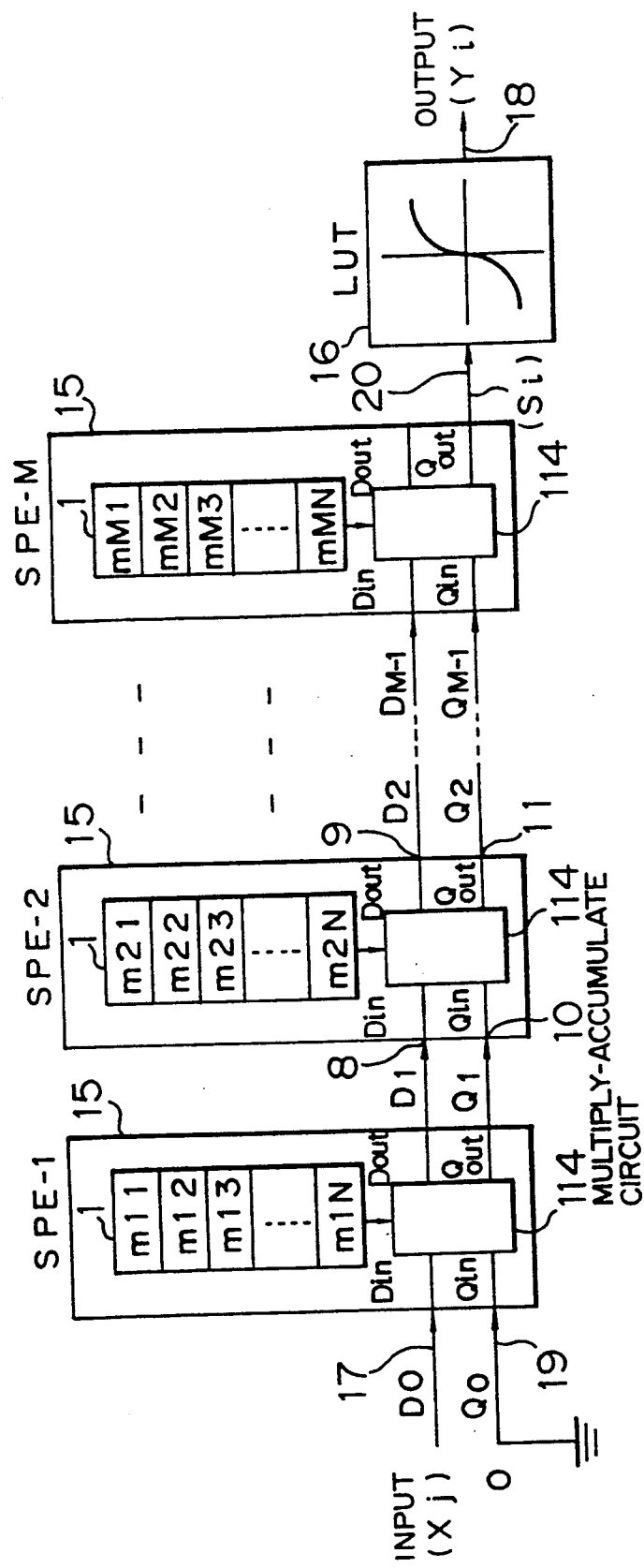
FIG. 2 shows a single layer neural net formed using a systolic array according to the invention.
Figure 3:
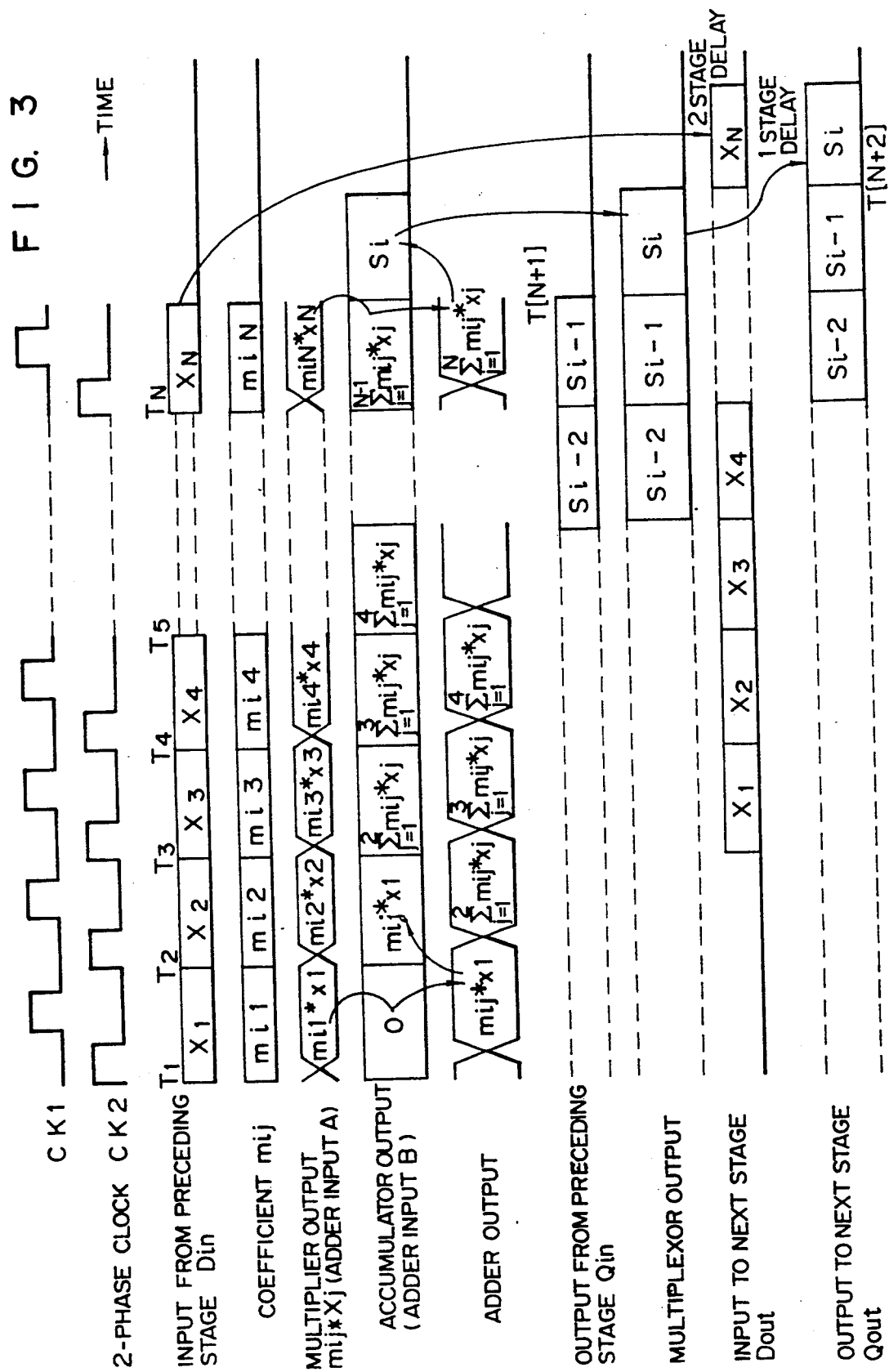
FIG. 3 is a timing diagram of the basic circuit operation of the systolic processor element.
Figure 4:
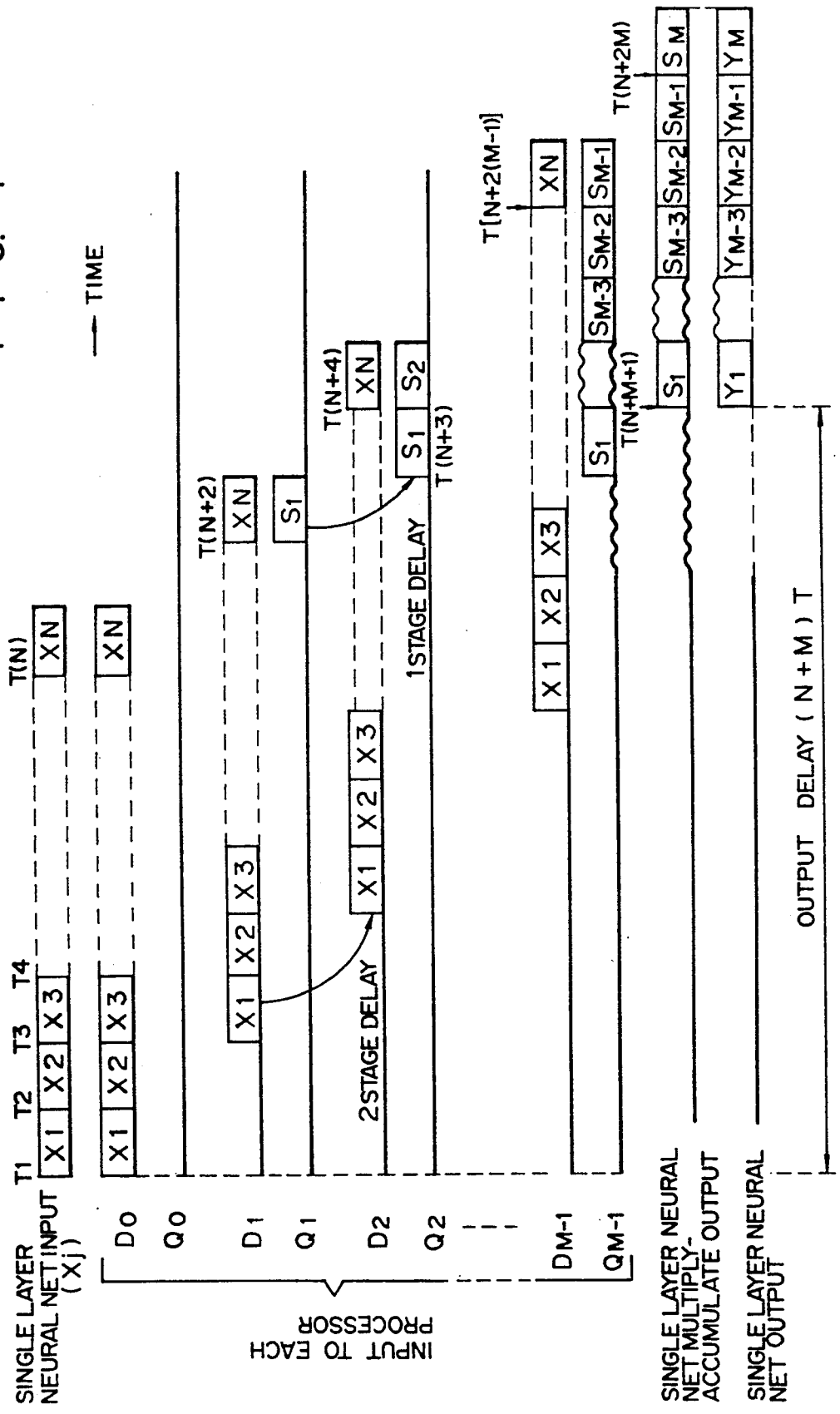
FIG. 4 is a timing diagram of the single layer neural net formed using the systolic array of the invention.

FIG. 1 shows a systolic processor element (hereinafter "SPE") that can be used in each of the neural nets of the present invention, and FIG. 3 is a timing diagram for the SPE. The processor element functions equivalently to one neuron, except for nonlinear functions. FIG. 2 shows an N inputs, M neurons single layer neural net comprised of M SPEs, and FIG. 4 is the timing diagram thereof.

The systolic processor element SPEi of FIG. 1, which performs the functions of the ith neuron, is comprised of a coefficient memory 1 for storing the ith neuron weight coefficient $\{mij\}(1 \leq j \leq N)$, a multiplier 2 for multiplying an input $\{Xj\}(1 \leq j \leq N)$ by the weight coefficient, an adder 3 for adding the result of the multiplication to an accumulator 4, a master-slave accumulator 4 constituted of a primary stage that latches signals in accordance with a clock CK1 and a secondary stage that latches signals in accordance with a clock CK2, an output data multiplexor 12 that selects an accumulation result 14 (neuron multiply-accumulate output) or a multiply-accumulate output 10 from the preceding stage, a master-slave output data latch 7 controlled by clock CK1 and clock CK2 for systolic array pipeline processing, a first input data latch 5 that applies an input data delay for pipeline processing and a second input data latch 6 for synchronizing the timing with the neuron multiply-accumulate output 14. Although not illustrated, these latches 5, 6 and 7 are driven to apply the prescribed delays by the non-overlap two-phase clocks CK2 and CK2.

An output receive terminal Qin receives the multiply-accumulate output (S1, S2, ..., Si-1) from the preceding processor element SPEi-1, which has the same configuration. An input data receive terminal Din receives neuron input data (X1, X2, .. ,) from SPEi-1, terminal Qout sends the multiply-accumulate output $\{S1, S2, ..., Si-1\}$ of the preceding stage together with multiply-accumulate output Si of element SPEi to the next stage element SPEi+1. Terminal Dout is for sending neuron input data $\{X1, X2, ..., \}$ to the next stage element SPEi+1.

The operation of an SPE will now be described with reference to FIG. 3. The systolic processor element is driven by the non-overlap two-phase clocks CK1 and CK2. At a time T1 the clock CK2 goes high and the first input data X1 is input from processor element SPEi-1. The weight coefficient mi1 (the coefficient for the first data input into the ith SPE) for multiplying the above data input is read out of the coefficient memory 1. The multiplier 2 multiplies the input data X1 by the weight coefficient mi1 and the result mi1 * X1 is passed to the adder 3.

The output mi1 * Xj of the multiplier 2 is accumulated by the adder 3 and accumulator 4. The accumulator 4 used for this is constituted as a master-slave flip-flop driven by two-phase clocks CK1 and CK2. Thus, even when clock CK1 goes high and data from the adder 3 is latched in the primary stage of the accumulator 4, an accumulator 4 secondary stage output signal latched in a preceding operation can be maintained. The adder 3 uses the output held in the secondary stage of the accumulator 4 in its addition operation. The output (accumulated value) of the accumulator 4's secondary stage at time T1 is 0, and this is added to the output mi1 * X1 of the multiplier 2 by the adder 3 and is latched in the primary stage of the accumulator 4 by clock CK1 going high between times T1 and T2.

Data input via the input data receive terminal Din is transferred to processor element SPEi+1 via the first and second input data latches 5 and 6, whereby it is given a time delay of two clock periods.

Before the completion of the accumulation (neuron multiply-accumulate product) operation:

$$Si = \sum_{j=1}^{N} mij * Xj$$

at the ith processor element SPEi, the output data (neuron multiply-accumulate output) from the preceding stages {..., Si-2, Si-1} input via the output receive terminal Qin is transferred to the output data terminal Qout via the output data multiplexor 12 and the output data latch 7, thereby receiving a time delay of one clock cycle.

At time T2 clock CK2 goes high, preceding stage data X2 is input via the input data receive terminal Din, the corresponding coefficient mi2 is read out of the coefficient memory 1 and the two are multiplied together by the multiplier 2, producing mi2 * X2.

In the same way, in synchronization with the clock CK2 going high at time T2, data mil * X1 latched in the primary stage of the accumulator 4 appears at the output of the secondary stage of the accumulator 4 and is added to the output mi2 * X2 of the multiplier 2, and the result mil * X1 + mi2 * X2 is then latched in the primary stage of the accumulator 4 by the clock CK1.

One series of multiply-accumulate arithmetic operations is completed when the following accumulation is output by the accumulator 4 at time T[N+1]:

$$Si = \sum_{j=1}^{N} mij * Xj$$

Upon completion, the accumulation result Si is transferred to the output data latch 7 via the output data multiplexor 12. After a delay of one clock cycle imposed by the latch 7, the neuron output Si is transferred at time T[N+2] to the next stage, via the output terminal Qout. The multiplexor 12 transmits output signal Sk(k<i) from the preceding stage to output data latch 7, except between times T[N+1] and T[N+2].

Figure 26:
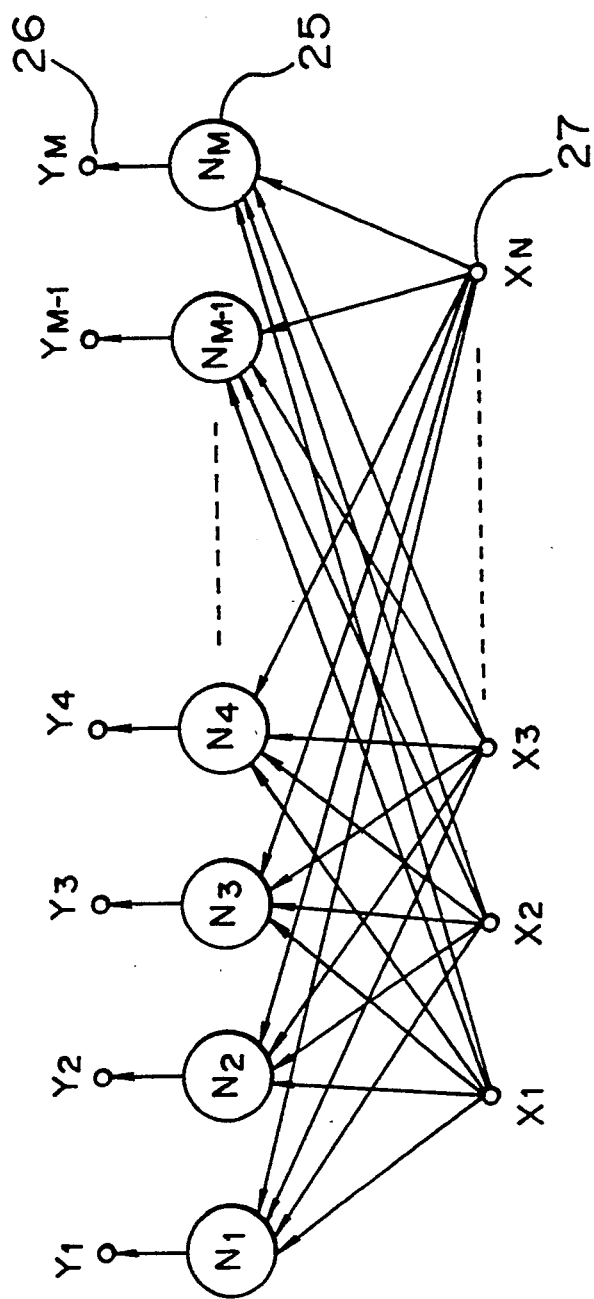
FIG. 26 shows a conventional single layer neural net.

FIG. 2 shows an N inputs, M neurons single layer neural net comprised of M SPEs, and FIG. 4 illustrates the timing of this neural net. Each systolic processor element SPEi shown in FIG. 2 corresponds to the neuron Ni in the conventional single layer neural net illustrated in FIG. 26. Unlike the parallel input/output arrangement used in the conventional neural net, in the present invention inputs {Xi} are input serially via input terminal DO and outputs {Yi} are obtained serially from a sigmoid function look-up table 16. In addition, the arrangement of the present invention allows a multiply-accumulate output {Si} to be obtained from the neural net multiply-accumulate output line 20 prior to being passed through the sigmoid function.

The input data send terminal Dout of each SPE is connected to the input data receive terminal Din of the next SPE, and output data send terminal Qout is connected to the output data receive terminal Qin of the next stage. At each clock signal, single layer neuron input data {Xj} is input to the input data receive terminal Din (DO) of the first stage processor element SPE-1. There is no input to the receive terminal Qin (QO) of SPE-1, which is grounded.

The input data send terminal Dout of SPE-M is left open, and output data send terminal Qout is connected to the input terminal of the sigmoid function look-up table 16. The single layer neural net multiply-accumulate output {Si} is obtained from the send terminal Qout, and the following single layer neural net output is obtained from the output side of the sigmoid function look-up table 16.

$$Yi = f\left(\sum_{j=1}^{N} mij * Xj\right)$$

Here, the sigmoid function f( ) can be expressed:

$$f(u) = 1/(1 + EXP(-u)).$$

As illustrated by FIG. 2, as the only links are those between adjacent SPEs, the total number of links is twice the number of neurons M. Unlike the examples of the prior art shown in FIGS. 27 and 28 in which the same signal line is used for both inputs and outputs, adjacent SPEs are linked by just two data lines, one for inputs and one for outputs.

Figure 27:
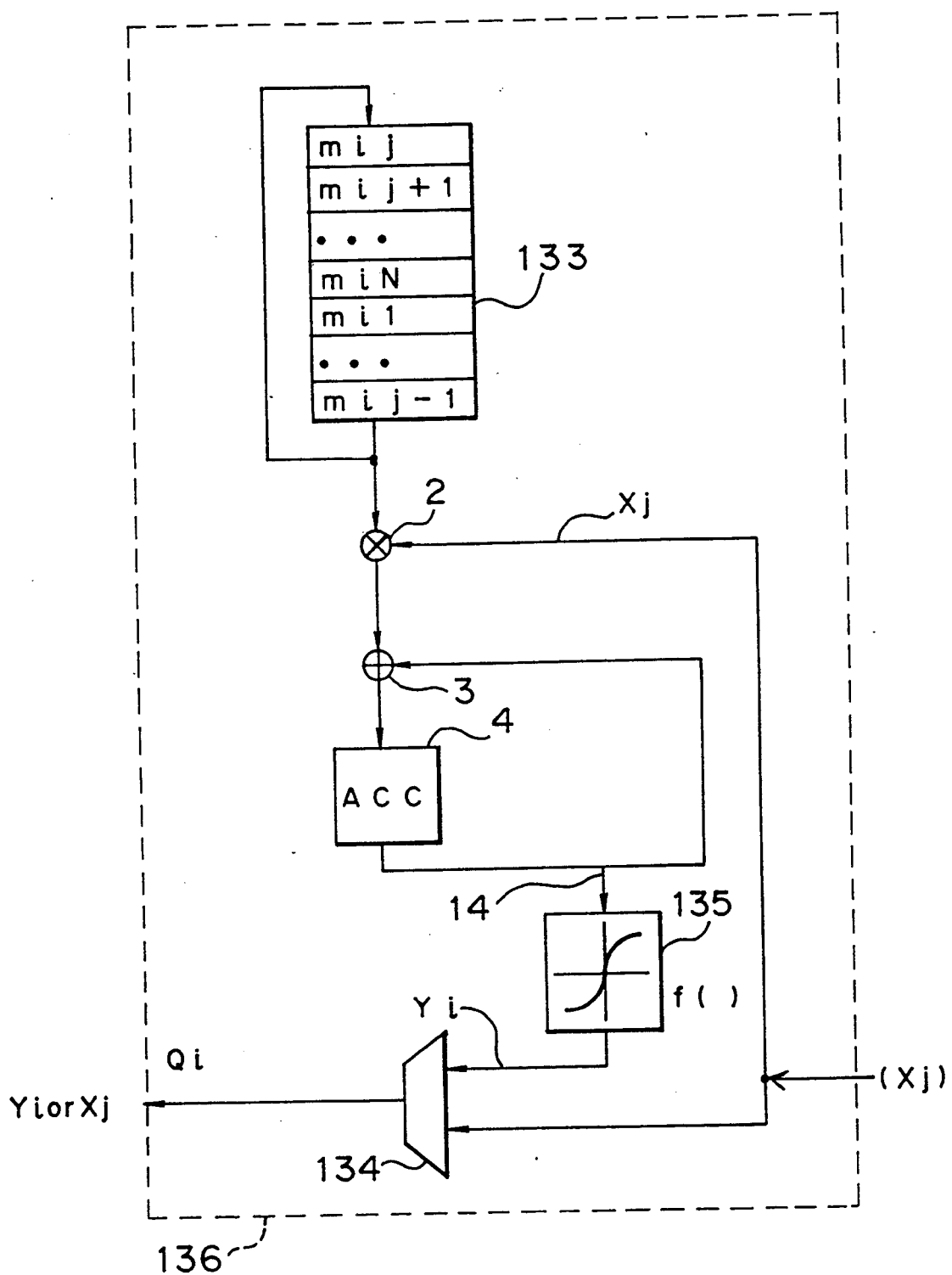
FIG. 27 shows a conventional systolic processor element described in reference (2)
Figure 28:
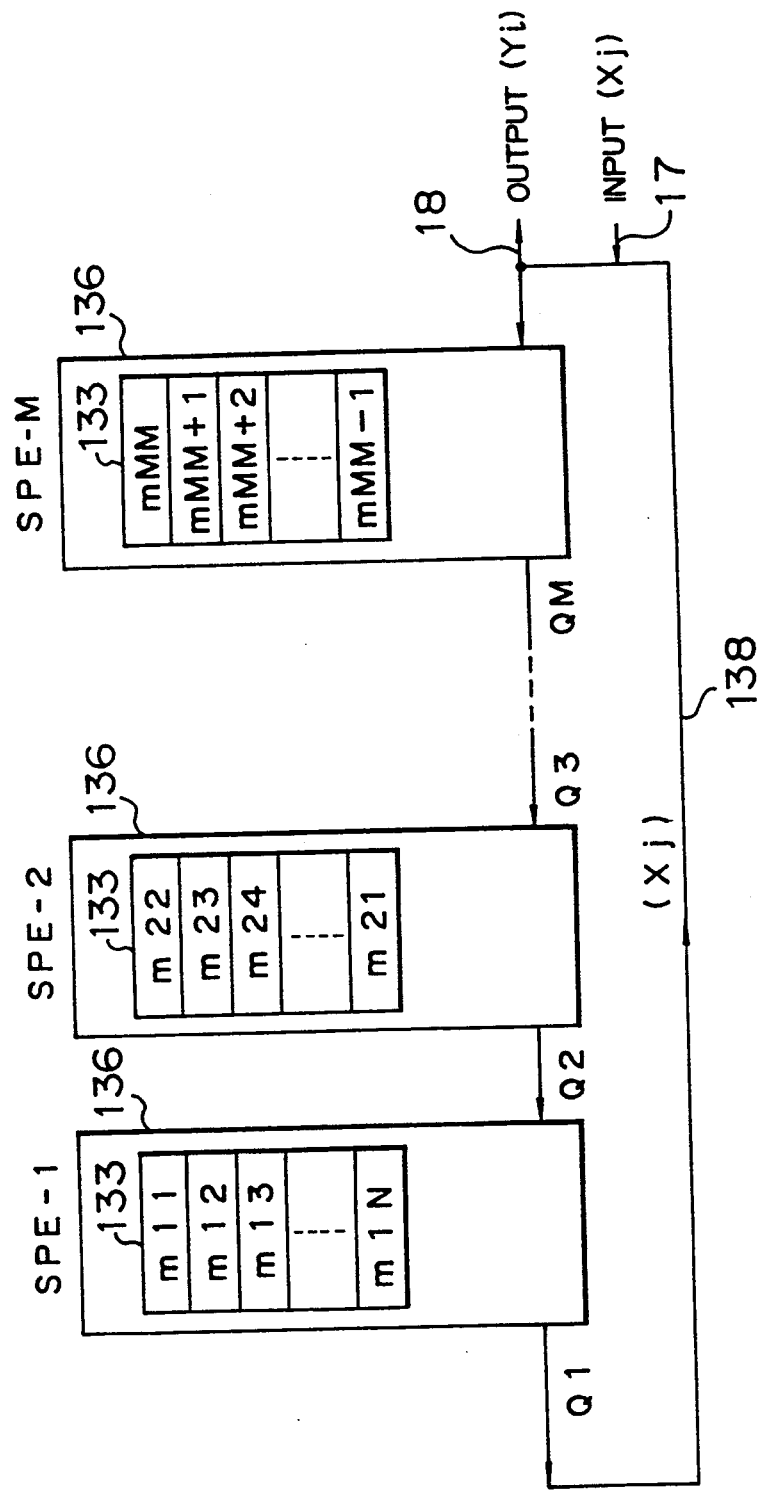
FIG. 28 is a single layer neural net formed using the conventional systolic processor element of reference (2)
Figure 30:
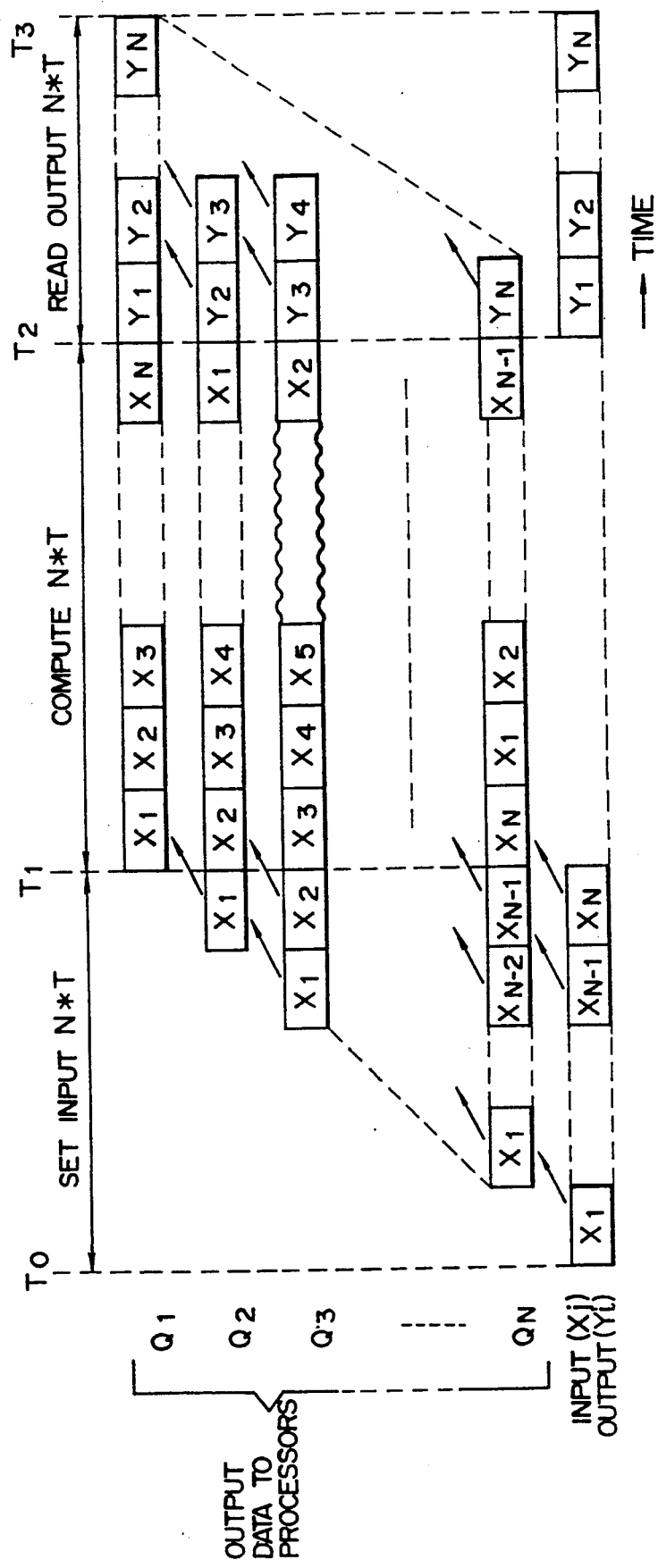
FIG. 30 is a second timing diagram of the operation of the single layer neural net formed using the conventional systolic processor element of reference (2)

Also unlike the examples in FIGS. 27 and 28 in which each processor element is equipped with a nonlinear function generator, only one of the sigmoid function look-up tables 16 which determine nonlinearity needs to be provided, and it is provided on the final stage. Nonlinear characteristics therefore can be changed readily, as such changes involve only rewriting the sigmoid function look-up table.

Nonlinearity f(u), for example, could be changed by changing the value of a in the following equation.

$$f(u) = 1/(1 + EXP(-a*u)).$$

Decreasing the value of a makes function f(u) smoother, resulting a slower response time in a system that uses the above neural net.

The operation of a single layer neural net will now be described with reference to FIGS. 2 and 4. As shown in FIG. 4, starting at time T1 input data elements X1, X2, ..., XN are input sequentially at periods T to the input DO of the first processor element of the array. Data D1 delayed by two clock cycles is input at time T3 to the second SPE and data D2 delayed by a further two clock cycles is input at time T5 to the third SPE. Subsequently too, each time the input data passes through each SPE it is subjected to a delay of two clock cycles.

In each SPE, the multiply-accumulate calculation for one neuron is carried out in N clocks (N cycles). At time T[N+2], the multiply-accumulate output S1 of the first neuron calculated in processor element SPE-1 is passed to the second SPE as output data Q1, as shown in FIG. 3. With each subsequent transfer through an SPE, multiply-accumulate output {Si} is delayed by one clock. Thus, the time at which multiply-accumulate output S1 is transferred from the second to the third SPE will be T[N+3].

The timing function of the output data {Si} ($1 \leq j \leq M$) and input data {Xj}($1 \leq j \leq N$) will now be discussed. To enable the systolic array to perform pipeline processing, a delay latch of at least one stage is included in the signal path of the multiply-accumulate output {Si} and the input data {Xj} in each SPE (latches 7 and 5 in FIG. 1).

If only a one-stage latch is provided for {Xj} on the input data side, the transfer of input data XN from processor element SPE-1 to processor element SPE-2 on D1 will take place at time T[N+1]. (In FIG. 4 in which a two-stage latch is provided the transfer time is T[N+2].) As shown by the processor element circuit of FIG. 1, the delay from the input of the final data item XN to the appearance of the multiply-accumulate output Si at the output data multiplexor 12 is only the accumulator 4 delay of one clock cycle. As a result, the time at which the multiply-accumulate output S2 of the SPE-2 appears at the output data multiplexor 12 of the same SPE-2 will be T[N+2], that is, after a delay of one clock cycle from the input of the final data item XN.

As shown by FIG. 4, SPE-1 multiply-accumulate output S1 will also enter the output data multiplexor 12 of SPE-2, via Q1, at T[N+2]. S1 and S2 do not pass through the multiplexor 12 of SPE-2 simultaneously. Instead, one of the signals is lost, which makes neural net processing impossible.

To avoid this problem, a second input data latch 6 is provided in the signal path of input data {Xj}, as shown in FIG. 1. The result, as shown in FIG. 4, is that the final data input enters SPE-2 at time T[N+2] and the multiply-accumulate output of the processor element is transferred to the SPE-2 multiplexor 12 at time T[N+3]. As the multiply-accumulate output S1 from processor element SPE-1 enters the multiplexor 12 of the processor element one clock cycle later than T[N+2], there is none of the above-mentioned conflict between S1 and S2.

In the processor element SPE-i, after the multiply-accumulate output up to the preceding element {Sk} (k≦i−1) is transferred to the next stage by multiplexor 12, accumulation to the ith element SPEi is concluded and the multiply-accumulate result Si is transferred to the next stage, by the same multiplexor.

Single layer neural net multiply-accumulate outputs S1, S2, ..., SM appear at the output terminal of SPE-M after a delay (N+M)T and are passed through sigmoid function look-up table 16 to obtain single layer neural net outputs Y1, Y2, ..., YM. The delay between data input X1 and the appearance of the first output Y1 is (N+M)T. Here, N is the number of inputs (number of input terminals), M is the number of processor elements (number of neurons) and T is the clock period.

Unlike the conventional arrangements shown in FIGS. 27 and 28, in the systolic processor of the present invention separate lines are used for transferring the input data {Xj} and the multiply-accumulate output data {Si}. This eliminates the type of I/O data conflict that is a problem in the conventional arrangements and makes high speed processing possible. When N≧M, for example, the completion of the input of one set of data elements X1 -XN can be followed without a break by the next set X1′- XN′. This type of continuous data input is essential for the continuous processing of high-speed signals such as video signals on a real-time basis.

When N≦M, there is a wait of duration MT between the input of X1 and the input of the next set of data. However, in this case data {Yi} can be output continuously, providing highly efficient data transfer performance. Also, as the need for the type of signal feedback from the first stage element to the final stage element, such as in the conventional arrangement illustrated by FIG. 28, is eliminated, there are no synchronization problems involved when configuring large-scale neural nets.

The SPE according to the present invention can be adapted for other neural nets in addition to the single layer neural net. Some examples of such applications to the type of multilayer neural net shown in FIG. 31 will now be described. In this type of multilayer neural net the results of decisions in the first layer are received by the second layer for decisions at a higher-level. As such, these multilayer nets provide a higher level of function and performance than single layer nets.

FIG. 5 shows the circuit configuration of a two layer neural net according to the present invention. Here, the output {Yj}0 of the first layer only needs to be turned around for input to the input D0 of the second layer. In the drawing, the number of data inputs and neurons are denoted respectively by N1 and M1 for the first layer and N2 and M2 for the second layer.

Figure 6:
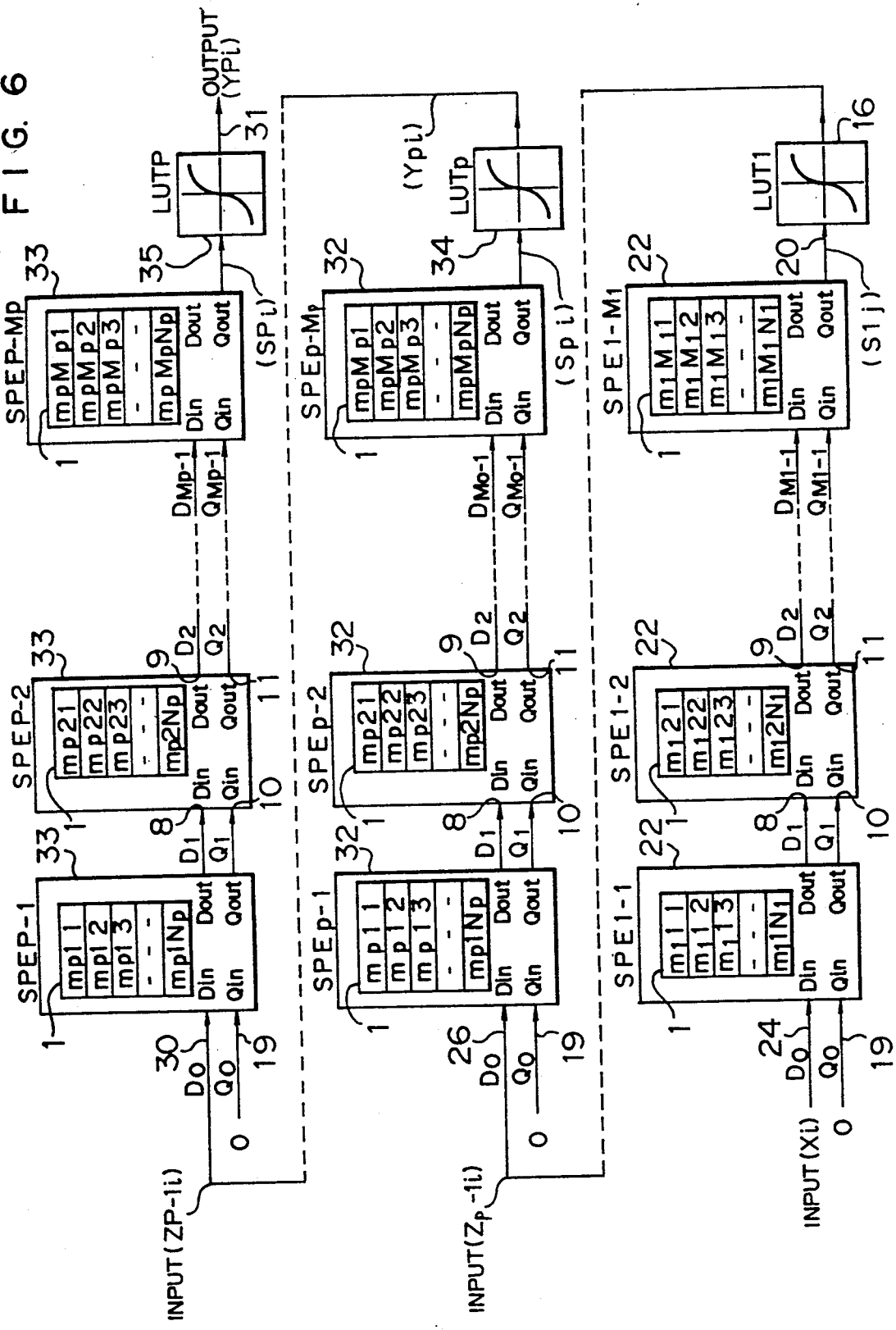
FIG. 6 shows a multilayer neural net formed using a systolic array according to the invention.
Figure 31:
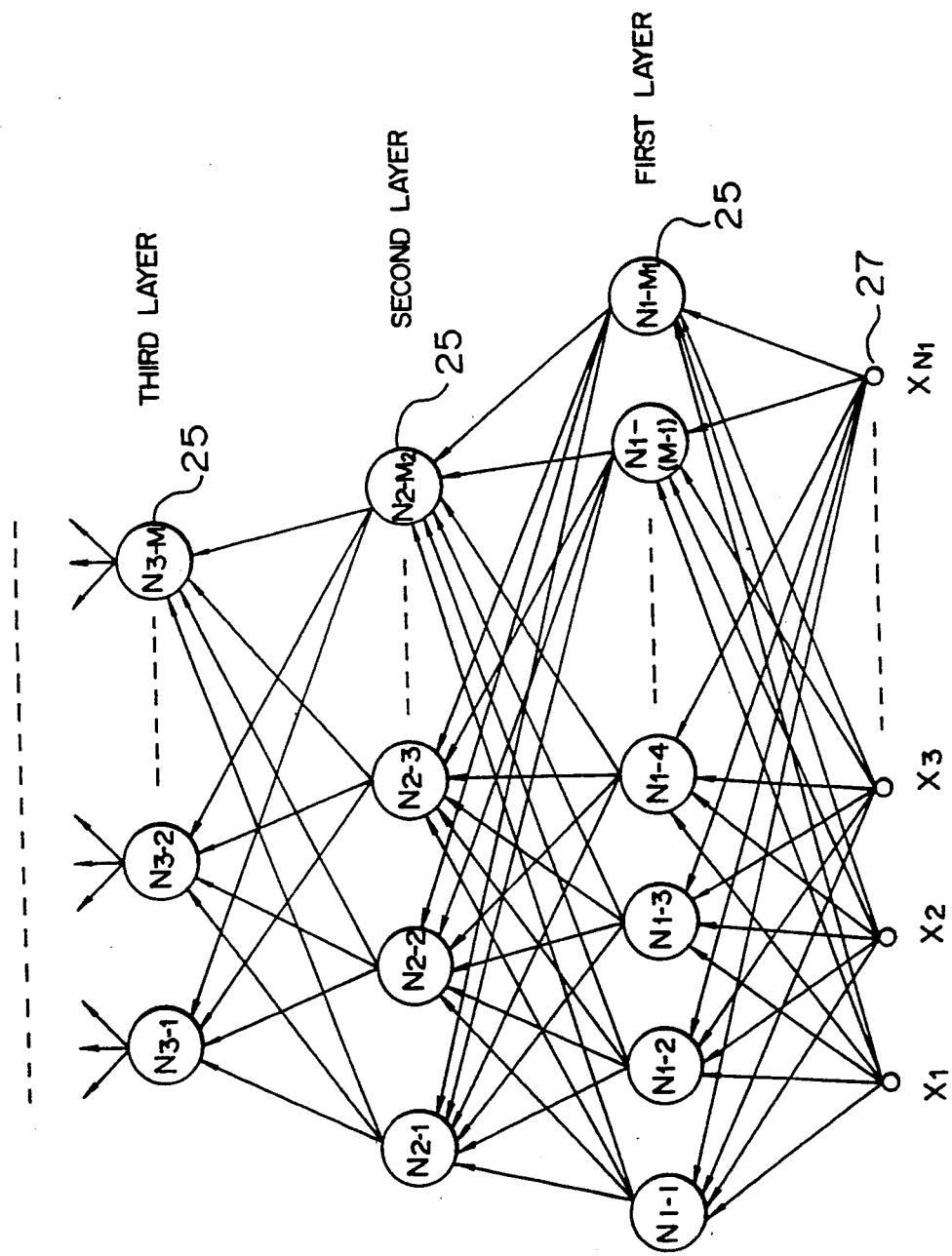
FIG. 31 shows a conventional multilayer neural net.

FIG. 6 illustrates the systolic array expanded to a multilayer neural net such as the one shown in FIG. 31. Despite the large size of this neural net data transfer only takes place between adjacent processor elements, so an increase in the load does not produce a deterioration in the speed. Layers are connected by a single link, which is also a major decrease.

Each layer is provided with a single sigmoid function look-up table 16, which makes it easy to reprogram system characteristics. Moreover, since data input and data output use separate lines, continuous data input is possible without I/O conflicts.

Figure 7:
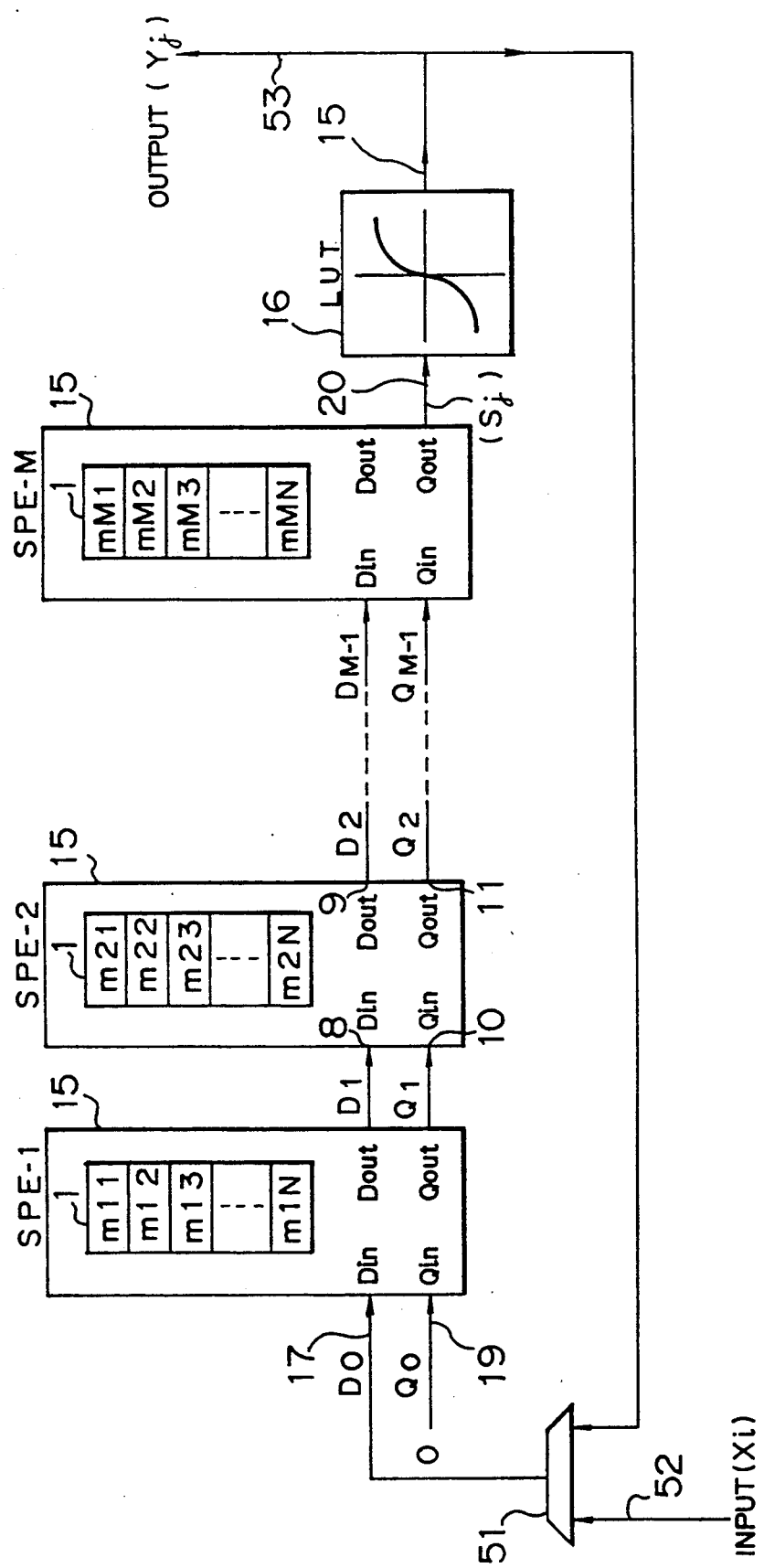
FIG. 7 shows a feedback type single layer neural net formed using a systolic array according to the invention.

FIG. 7 shows a systolic array applied to the single layer feedback neural net (Hopfield neural net) shown in FIG. 32. In a Hopfield net a decision result {Yi} is emphasized by iteration through the same neural net. That is, excited neurons (neurons exhibiting a high output value) are emphasized and non-excited neurons (neurons exhibiting a low output value) are increasingly suppressed by the outputs of the other neurons.

Configuring a net using the systolic array is straightforward, involving only arranging for the output of the look-up table 16 to be fed back to the input D0 via a multiplexor 51. Input initialization only involves the transfer of input data 52 to the input D0 via the multiplexor 51.

Figure 8:
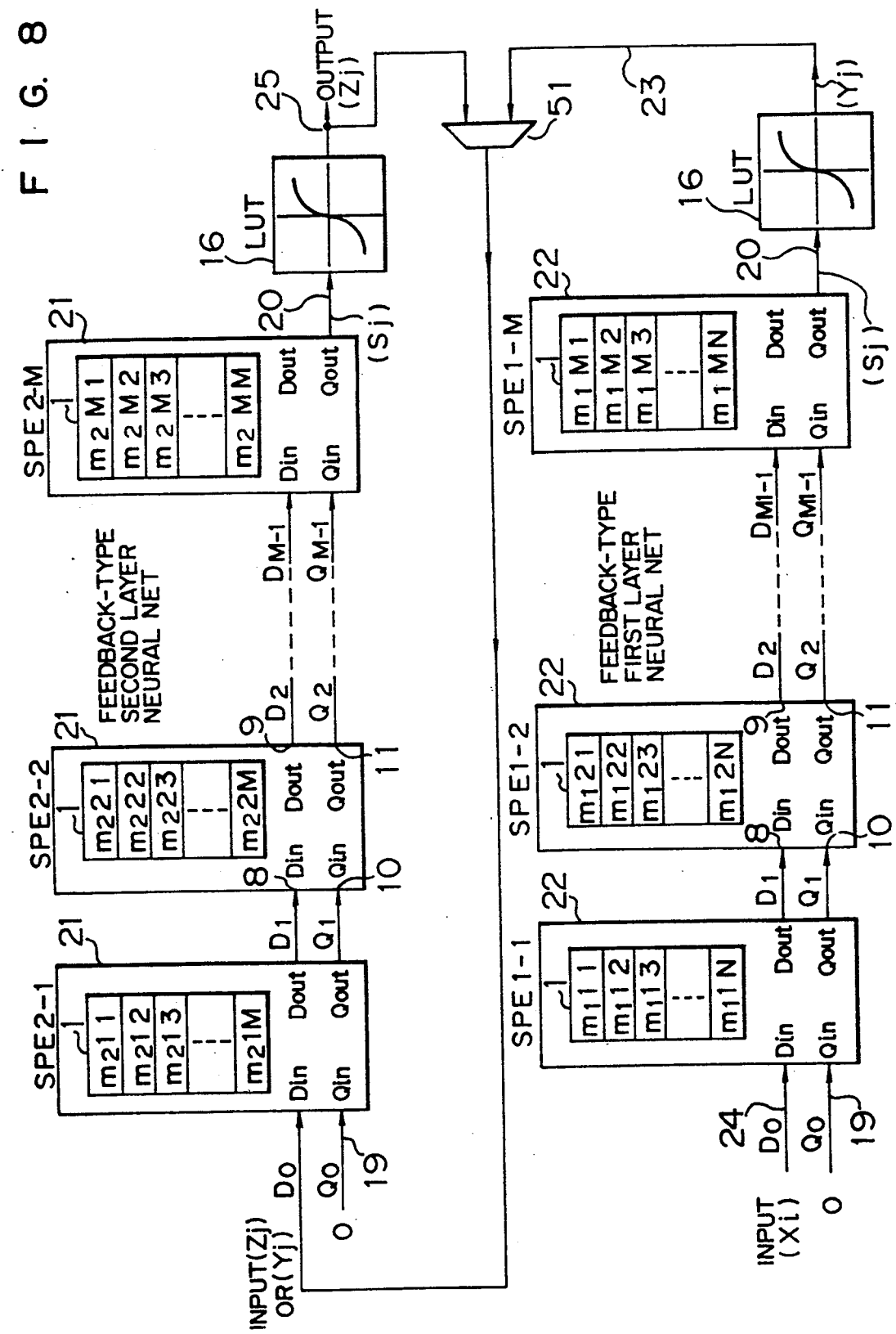
FIG. 8 shows a Hamming two layer neural net formed using a systolic array according to the invention.
Figure 33:
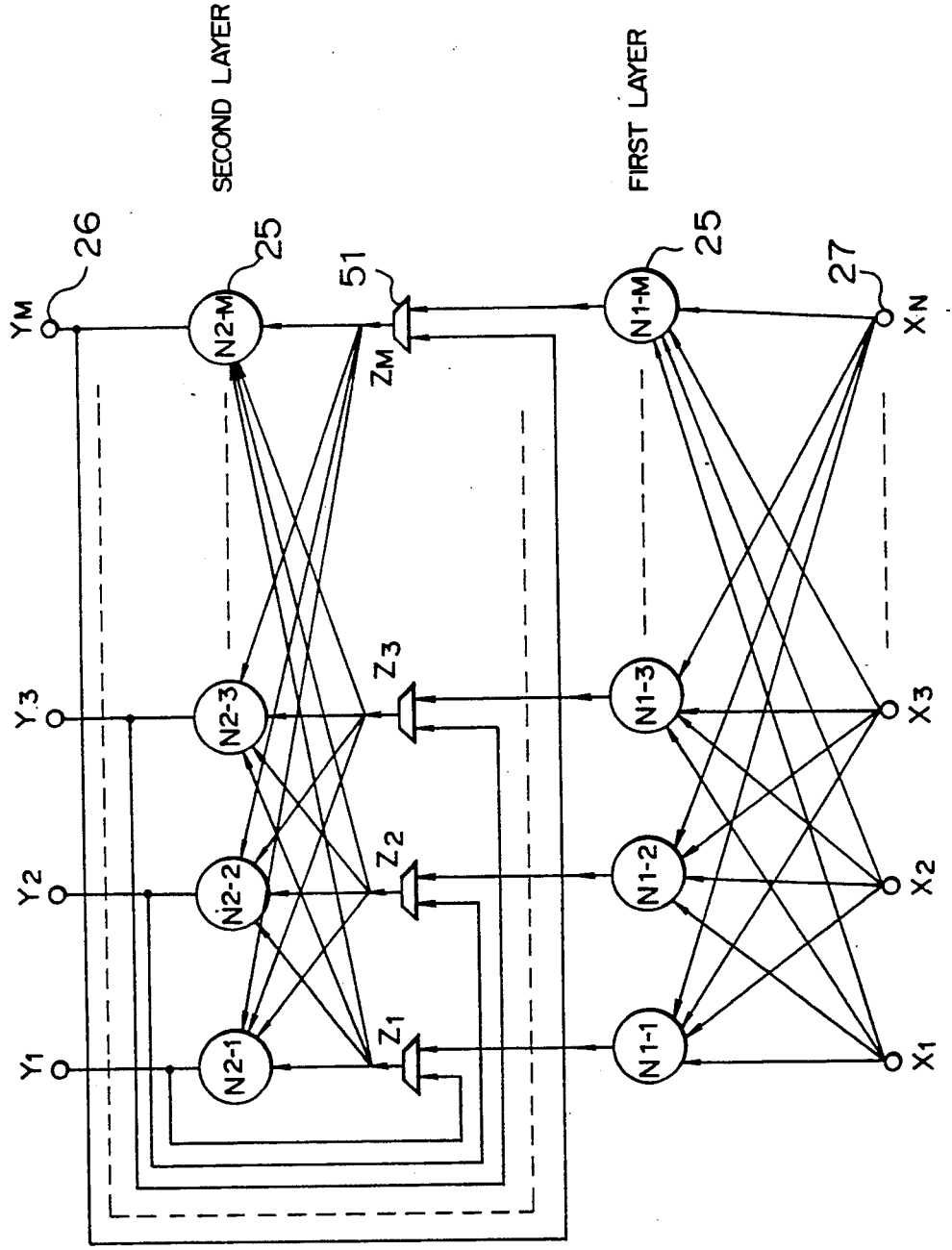
FIG. 33 shows a conventional feedback two layer (or Hamming) neural net.

FIG. 8 shows a Hamming neural net (FIG. 33) formed by a systolic array in which only the second layer is a feedback type. Functions equivalent to those of the neural net of FIG. 33 are realized by inputting the output from the non-feedback first layer into the input data multiplexor 51 of the feedback second layer.

In this type of neural net, decisions of the first layer are emphasized by the second layer, which is more efficient than the Hopfield arrangement in which one layer performs both processes.

Figure 9:
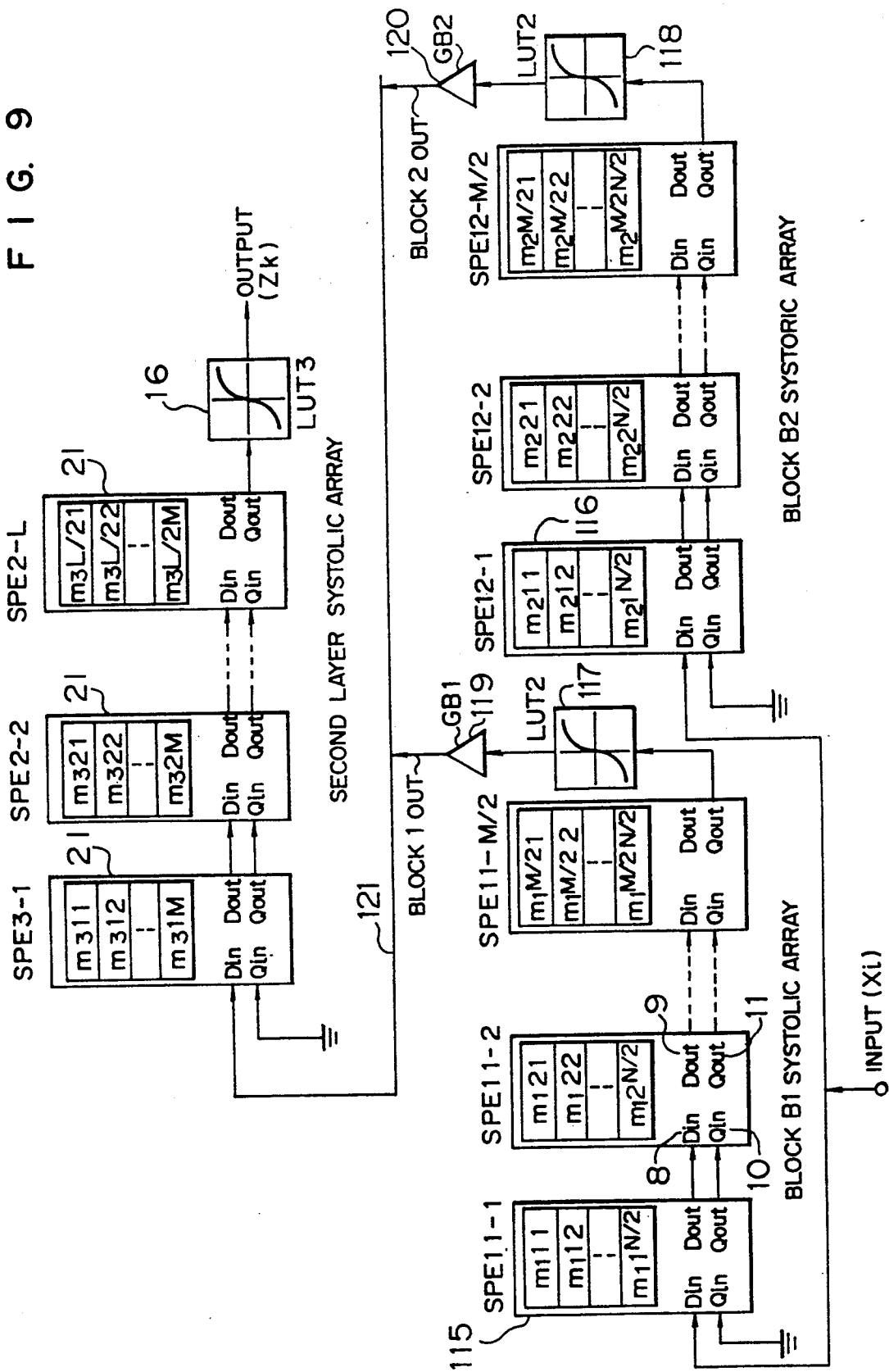
FIG. 9 shows a clusterized neural net formed using a systolic array according to the invention.

FIG. 9 shows a clusterized neural net according to the present invention in which the first layer of a two-layer neural net has been divided into two blocks for higher speeds. In an actual application, there are strong links (i.e. having a weight coefficient with a high absolute value) and weak links. In the natural world, this type of synaptic connection is seen frequently. Processing speed can be raised by omitting all non-significant connections to eliminate unnecessary multiply-accumulate operations and data transfers.

With reference to FIG. 9, the X1−XN/2 half of the input data is input only to the block SPE11-1–SPE11-M/2 on the left side of the first layer, and the remaining data XN/2+1 −XN is transferred only to the block SPE12-1 –SPE12-M/2 on the right, and there are no connections between the blocks. The outputs of each block are transferred to the second layer systolic array via output gates 119 and 120 and a local data bus 121.

Figure 10:
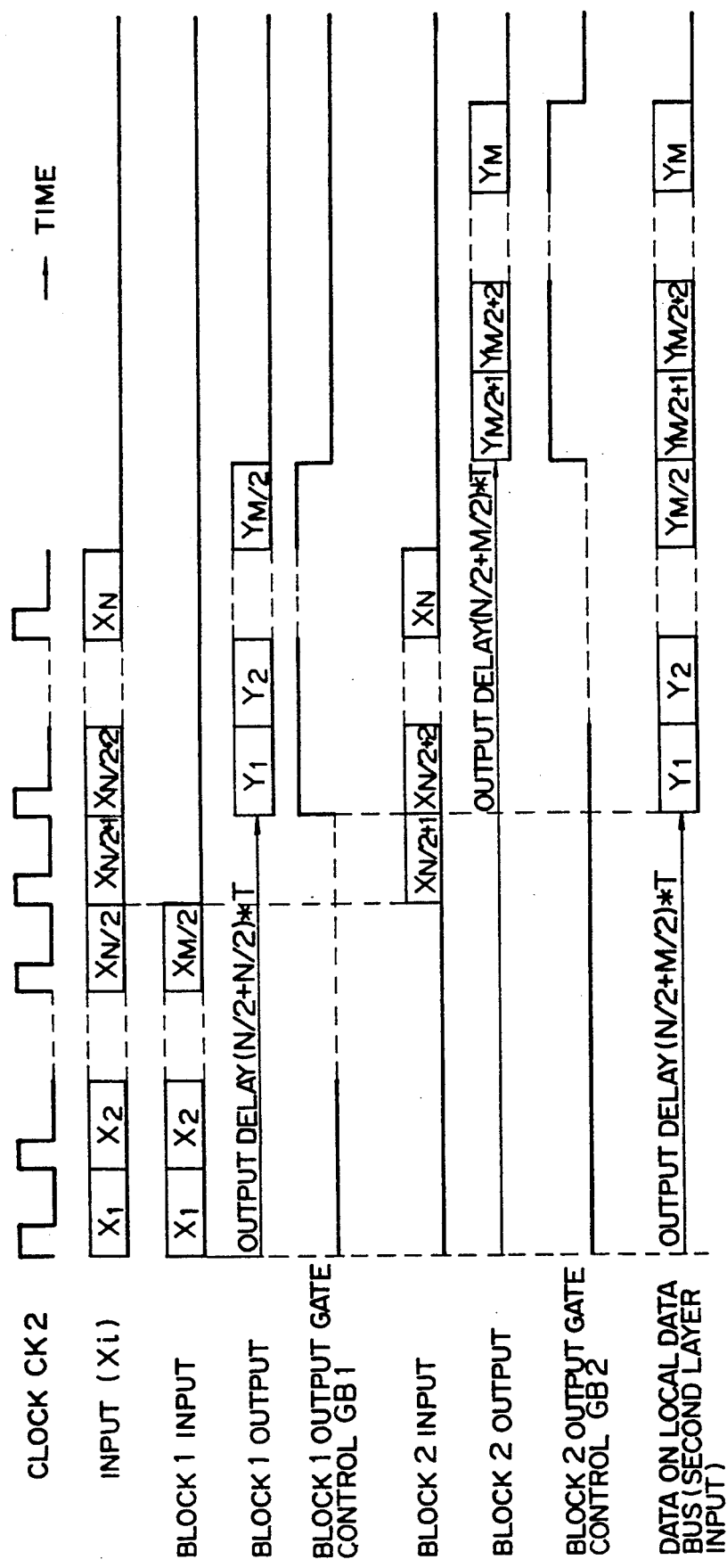
FIG. 10 is a timing diagram of the clusterized neural net formed using the systolic array of the invention.

The timing of these operations will now be described with reference to FIG. 10. At a time (N/2+M/2)T from the point at which input of the left-side block input data X1, X2, ..., XN/2 commences, output Y1, Y2, ..., YM/2 from the same block appears at the sigmoid function look-up table 117, and the first gate 119 opens to allow this data to be transferred across the local data bus to the systolic array of the second layer.

Continuing on, at a time (N/2+M/2)T from the start of the input of the data XN/2+1, XN/2+2, ..., XN of the block on the right in FIG. 9, the output YM/2+1, YM/2+2, ..., YM of that block appears at a second sigmoid function look-up table 118, the second gate 120 opens to allow this data to be transferred across the local data bus to the systolic array of the second layer.

Here, as the systolic array of the first layer is divided into M/2 neurons, N/2 input data, the delay between input and output in each block can be reduced to (N/2+M/2)T. Since this data is transferred without modification to the second layer via the local data bus, even on an overall basis the first layer delay is halved to (N/2+M/2)T. Thus, the SPE of FIG. 1 can be used to construct a variety of neural net processors.

Figure 11:
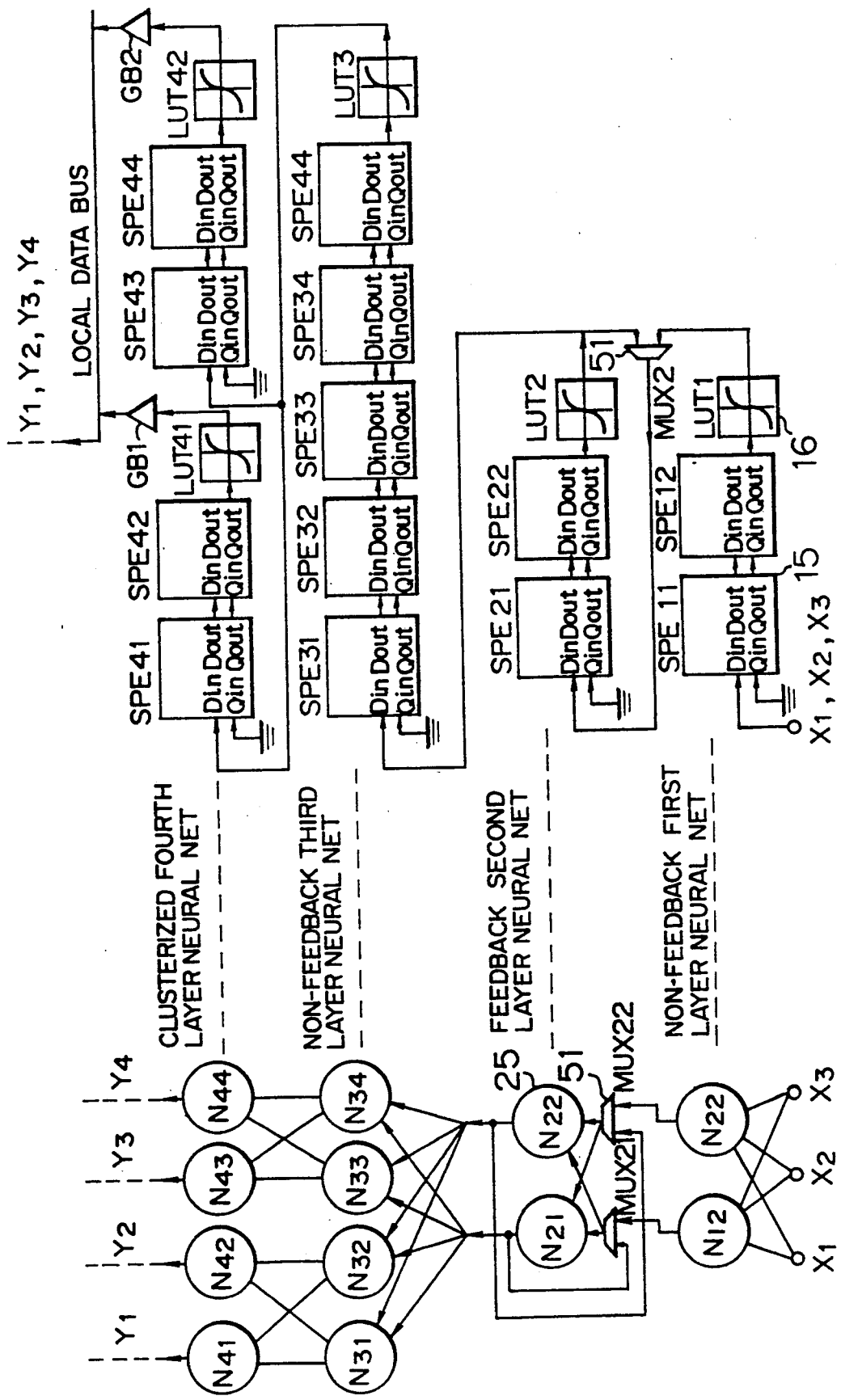
FIG. 11 shows a general structure of a multilayer neural net formed using the systolic array of the invention.

FIG. 11 shows an example of a general neural net constructed using an array of the systolic processor elements of the invention. In this example, the neuron number Nij corresponds to the systolic processor element number SPEij. The first and third layers are non-feedback types, the second layer is a feedback type, and the fourth layer is a clusterized type.

Using a systolic array thus enables complex multi-layer neural nets to be readily constructed.

Figure 12:
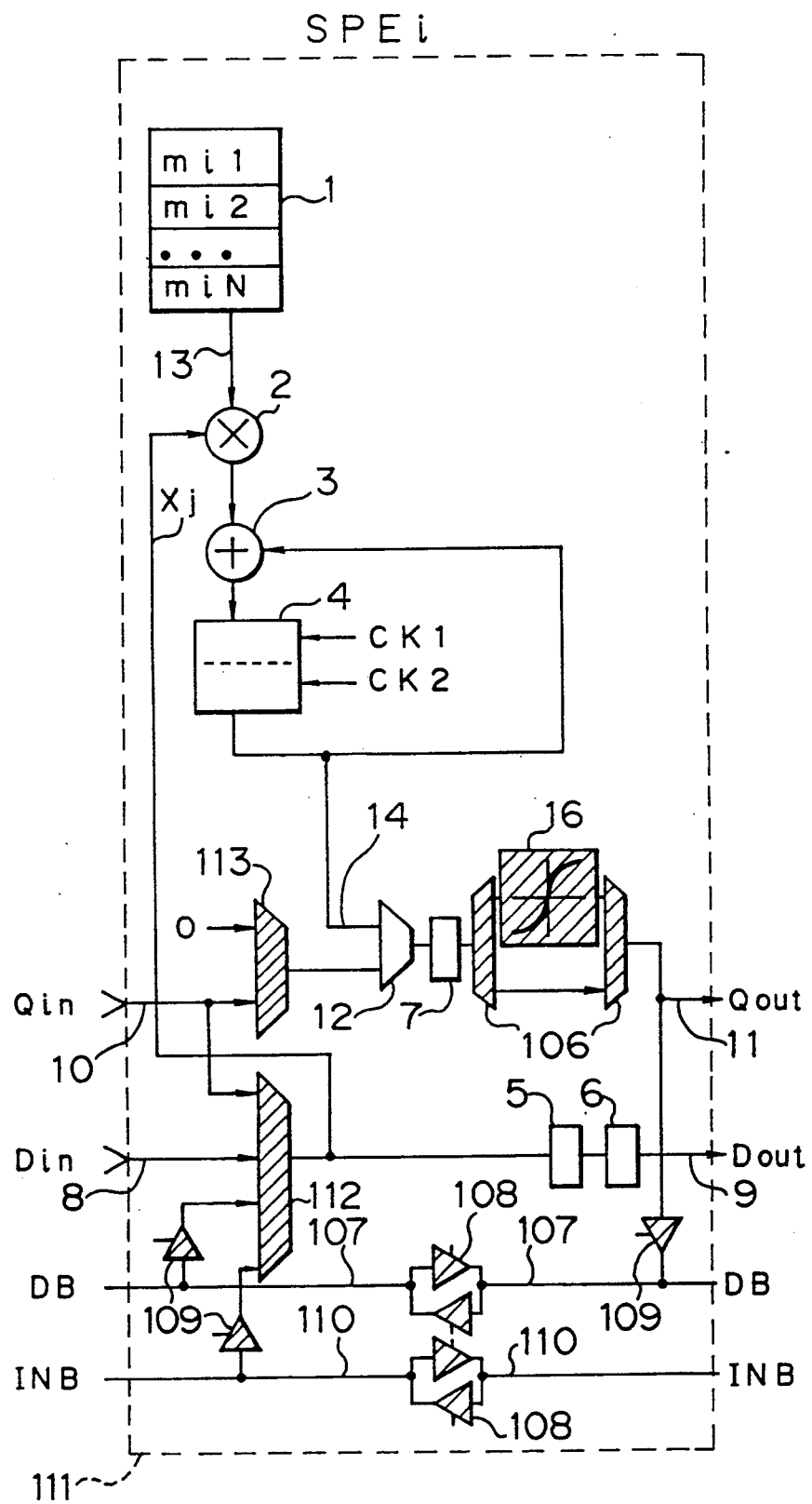
FIG. 12 shows a systolic processor element according to the present invention which enables a neural net configuration to be changed.

A general-purpose neural net described as the fourth object can be realized using the processor element circuit arrangement shown in FIG. 12. The arrangement of FIG. 12 is the basic circuit of FIG. 1 with the addition of the shaded portions. These additions are: a multiplexor 113 for selecting output data; a multiplexor 112 for selecting input data; a sigmoid function look-up table 16 and multiplexor 106 for selecting between passing or not passing output data through a sigmoid function; data bus 107 for transferring data between local processors; an input data bypass bus 110; a two-way gate 108 and a gate 109.

Figure 13:
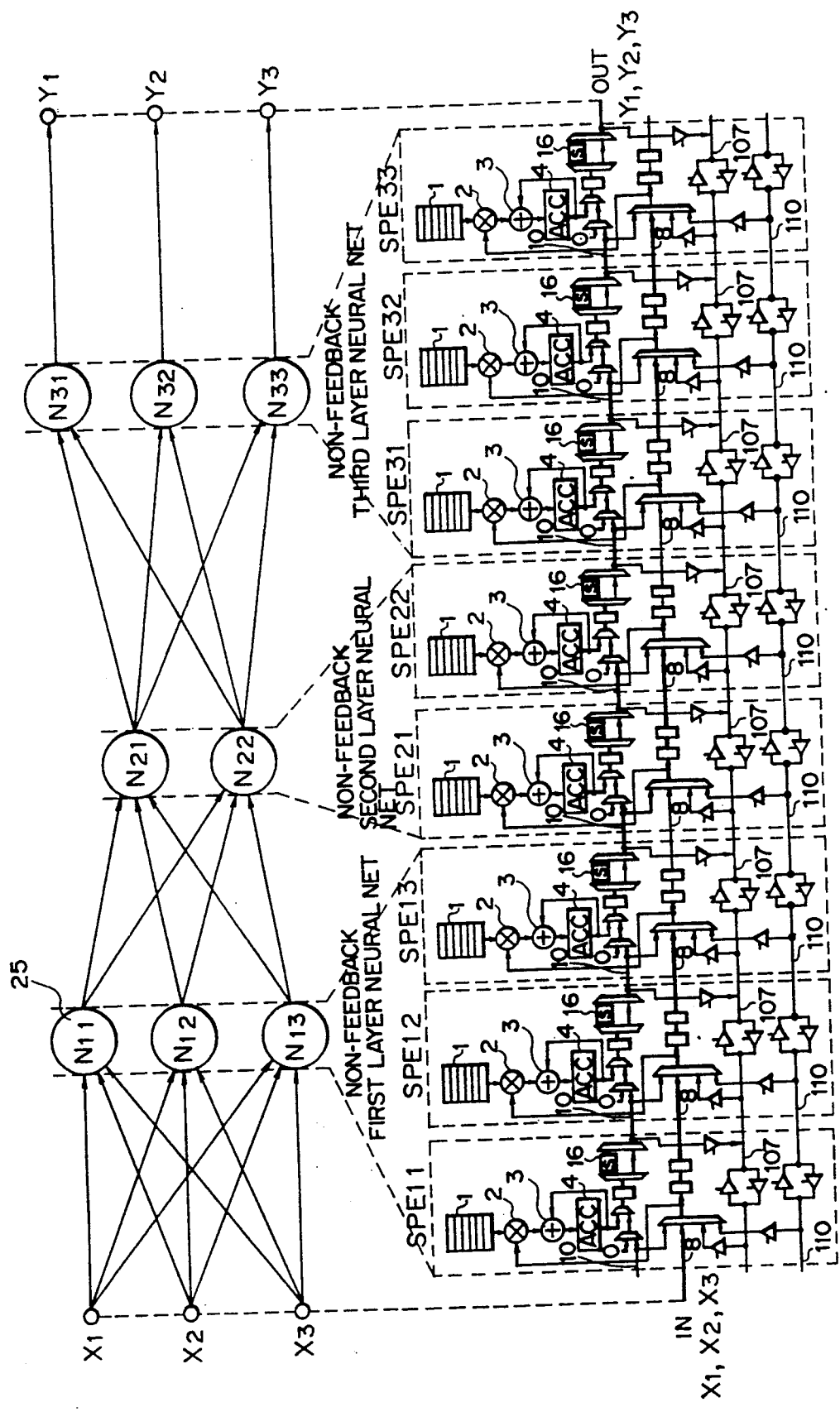
FIG. 13 shows a first neural net reconfiguration (to form a three layer neural net) in accordance with the invention.

FIG. 13 shows an embodiment using eight of the processor elements illustrated in FIG. 12. The three types of neural net shown in FIGS. 13, 14 and 15 can be constructed merely by appropriately programming the signal channels of the eight elements. The activated signal channel running horizontally through the array elements is indicated by a bold line.

The embodiment of FIG. 13 is configured as a three layer neural net in which the first and third layers are each constituted of three neurons and the second layer of two neurons. This configuration can be implemented by programming the systolic array to produce the signal channel as shown.

SPE11, SPE12 and SPE13 form the three-neuron net of the first layer. The output of SPE13 is transferred via the look-up table 16 to the SPE21 and SPE22 that form the second layer. After passing through the look-up table 16 of SPE22, the data is propagated to the third layer array elements SPE31, SPE32 and SPE33. The configuration and operation of each layer is based on the circuit shown in FIG. 2.

Figure 14:
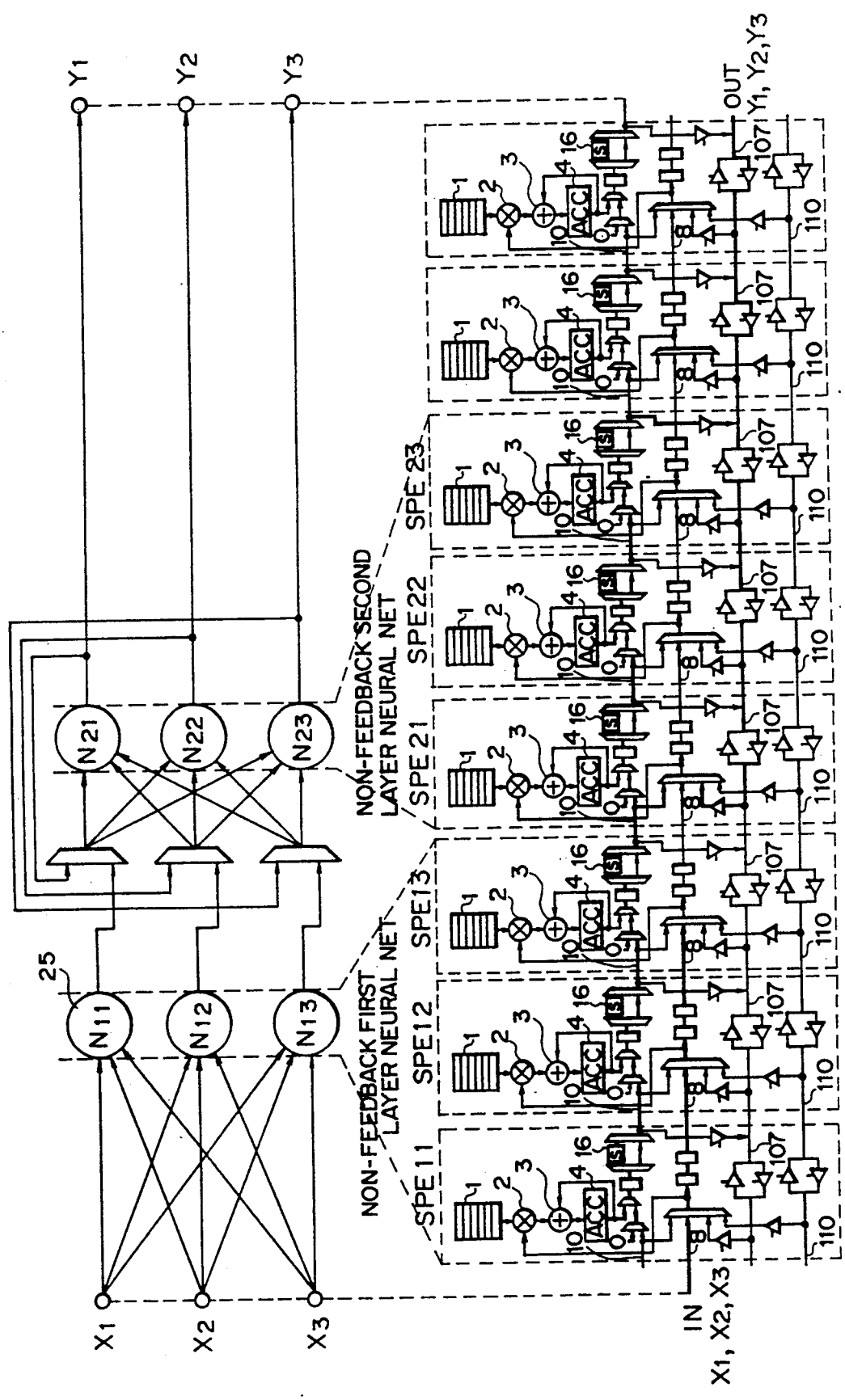
FIG. 14 shows a second neural net reconfiguration (to form a Hamming neural net) in accordance with the invention.
Figure 15:
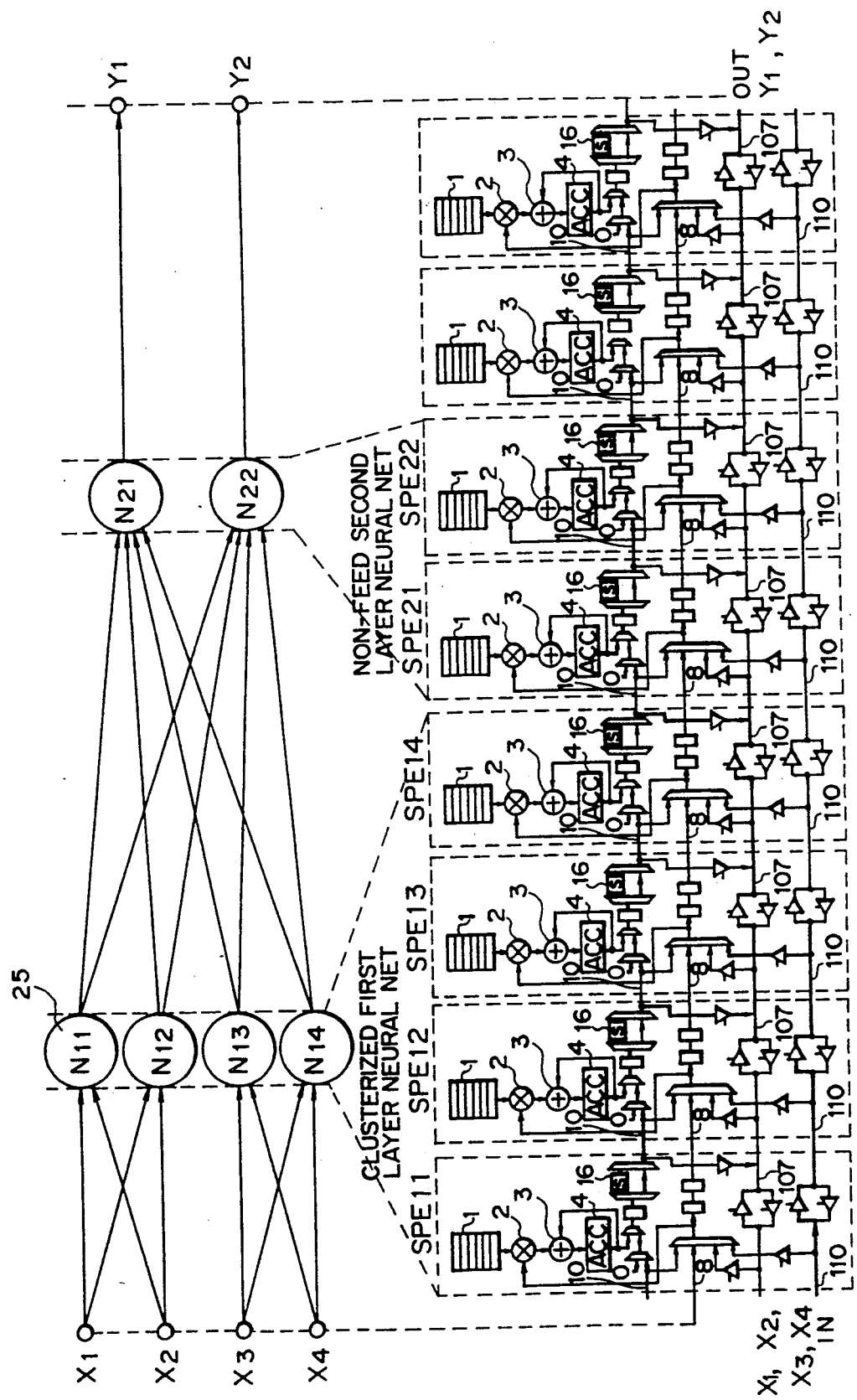
FIG. 15 shows a third neural net reconfiguration (to form a clusterized neural net) in accordance with the invention.

The embodiment shown in FIG. 14 is a Hamming neural net provided with a three-neuron non-feedback first layer and a three-neuron feedback second layer SPE11, SPE12 and SPE13 form the first layer. The output of SPE13 is propagated to SPE21 via the look-up table 16 of SPE13.

The input multiplexor of SPE21 receives the signal together with the feedback signal which is fed back from SPE23 via local data bus 107, and switches between these signals to perform the operations described with reference to FIG. 8. In the embodiment shown in FIG. 15, the first layer of the neural net constituted of four neurons is divided into two parts. With reference to the upper part of the drawing, inputs X1, X2 are input only to the first block of the first layer comprised of N11, N12, and inputs X3, X4 are input only to the second block comprised of N21, N22. The output of the first layer neural net goes to each of the neurons N21, N22 of the second layer, and combined.

To implement this, input data is input directly via the local input data bus 110 to the input terminals of SPE11, which processes the first block, and SPE13, which processes the second block. The output of the first block goes to the local data bus 107 via the sigmoid function look-up table 16 and gate of SPE12. The output of the second block also goes to the local data bus 107, via the sigmoid function look-up table 16 and gate of SPE14.

The outputs of the first layer combined on the local data bus 107 are input to the second layer element SPE21 and the output thereof is directed to the local data bus 107 via the sigmoid function look-up table 16 and gate of SPE22.

Described in the following are circuit embodiments for realizing the above architectures.

Figure 16:
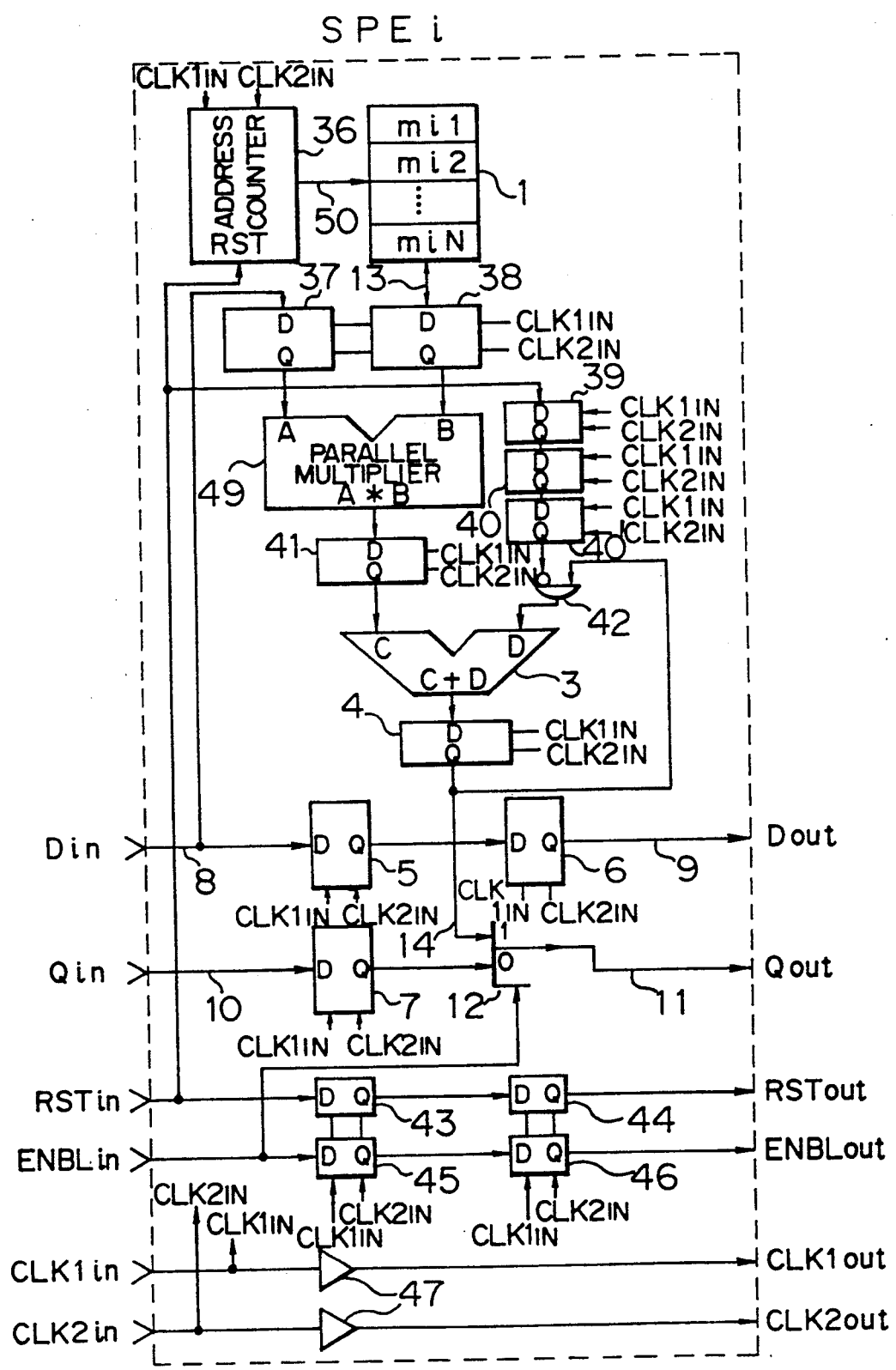
FIG. 16 shows the basic circuit configuration of a systolic processor element in which a parallel arithmetic unit is used, in accordance with the invention.

FIG. 16 shows an embodiment of a systolic processor element in which a parallel arithmetic unit is used to implement the basic arrangement of FIG. 1. The circuit is comprised of a parallel multiplier 49, adder 3, accumulator 4, coefficient memory 1, address counter 36 and output data multiplexor 12. The input of the parallel multiplier 49 is provided with an input data latch 37 and a coefficient data latch 38. An address 50 of the coefficient memory 1 is generated by an address counter 36. The address counter 36 increments the address in synchronization with the non-overlap two-phase clocks CLK1in and CLK2in, and is reset by reset signal RSTin. The transmission of the reset signal is synchronized with the input data Din, and a delay of two clock cycles is applied by RST signal delay latches 43 and 44 for the reset of the element of the next stage.

The multiplication data path includes a three-stage delay applied by the address counter 36 and the latches 38 and 41. Therefore there is a delay of three clock cycles between the release of the RST signal and the arrival of the first multiplication product multiplication product mi1 * X1 at the input terminal C of the adder 3. The initial zeroing of the input terminal D has to be synchronized with this. This requires that the RST signal be given a three-step delay by the reset signal latches 39, 40 and 40' and then input to the flip input terminal of the reset gate 42 to zero the said input terminal D.

Inserted between the parallel multiplier 49 and the adder 3 is a pipeline latch 41 which is not part of the basic architecture shown in FIG. 1. The inclusion of this latch enables multiplication procedure to be delayed by one machine cycle (i.e. one clock cycle), thereby increasing the margin with respect to circuit speed. (In the arrangement of FIG. 1 each multiplication and addition operation has to be executed in one cycle.)

The order in which the output data multiplexor 12 and the latch 7 are serially connected is irrelevant with respect to operation, so in this embodiment the output data multiplexor 12 has been positioned after the latch 7.

The transmission of the output data multiplexor 12 control signal ENBLin is synchronized with the input data, and by means of the two ENBL signal latches, is delayed by the amount of two clock cycles per SPE.

The non-overlap two-phase clocks CLK1in and CLK2in are regenerated by a clock buffer 47, amplified and sent to the next SPE. All of the internal circuitry in the SPE uses the input clocks CLK1in and CLK2in, thereby ensuring the reliability of the timing in each of the SPEs.

As the clock timing is thus incrementally delayed as the signals pass through the SPEs, it is possible for a large discrepancy to arise in the clock timing between the initial and final processor elements of a large neural net. Unless special synchronization means are used, this makes it difficult to implement the type of input data feedback line arrangement described in the prior art (FIGS. 27 and 28). This is not a problem with the processor of this invention in which data feedback is not required.

Figure 17:
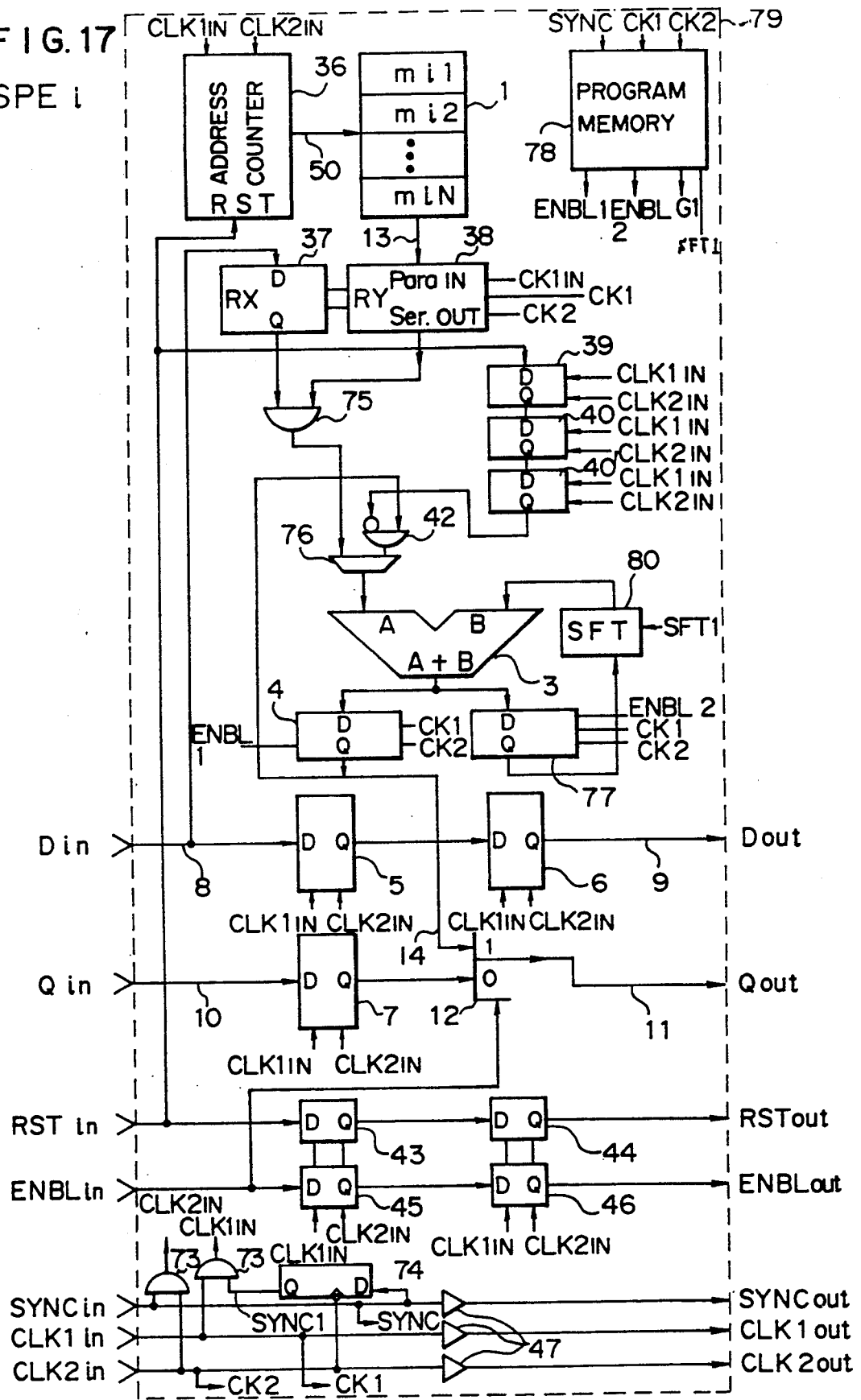
FIG. 17 shows the basic circuit configuration of a systolic processor element in which a serial arithmetic unit is used, in accordance with the invention.

FIG. 17 shows another embodiment of the arrangement shown in FIG. 1. In this embodiment, the parallel multiplier 49 of FIG. 16 has been replaced by a serial multiplier unit constituted of a shift circuit 80, multiplier accumulator 77 and adder 3. This allows the circuitry to simplified considerably. For 4-bit precision, in the case of the embodiment (FIG. 17) in which parallel multiplication is used, the SPE logic circuitry contains some 1,450 elements (transistors), of which 550 are used for the parallel multiplier. This means that taking out the parallel multiplier has reduced the number of circuit elements in this embodiment by one third. However, serial multiplication is less than one-quarter as fast as parallel multiplication. The number of circuit elements required for parallel multiplication is proportional to the square of the arithmetical precision, so the decrease in the number of elements provided by this embodiment is particularly large in the case of high levels of precision.

The present embodiment will now be described with reference to FIG. 17. The differences between this embodiment and the embodiment of FIG. 16 is that a program memory 78 is provided to store the processing sequence for executing the serial arithmetic operations, and the frequency of the externally generated clocks CLK1 and CLK2 is one-quarter that of the data.

The synchronization signal SYNCin has the same frequency as that of the data and defines the program memory initialization timing. The program memory provides just four types of control signal, ENBL1, ENBL2, G1 and SFT1. K bit multiplication can be executed by a program in K+1 steps, so only a small program memory is needed.

In addition to the accumulator 4, the adder is also provided with an accumulator 77 for serial multiplication, and each are separately enabled by enable signals ENBL1 and ENBL2. For the serial multiplication, an AND gate 75 is used to obtain the partial products (theoretical product) which is input to the adder 3 via multiplexor 76. To this partial product data the adder 3 adds the contents of the accumulator 77 shifted one bit. Serial multiplication is implemented by repeating this procedure.

The SPE uses clocks CK1 and CK2 that have one-quarter the data frequency, and non-overlap two-phase clocks CLK1in and CLK2in, which have the same frequency as the data. The latter is produced by a SYNCI generation D flip-flop and clock generator AND gate 73, and are used to drive the various signal delay latches 5, 6, 7, 43, 44 and 45.

Figure 18:
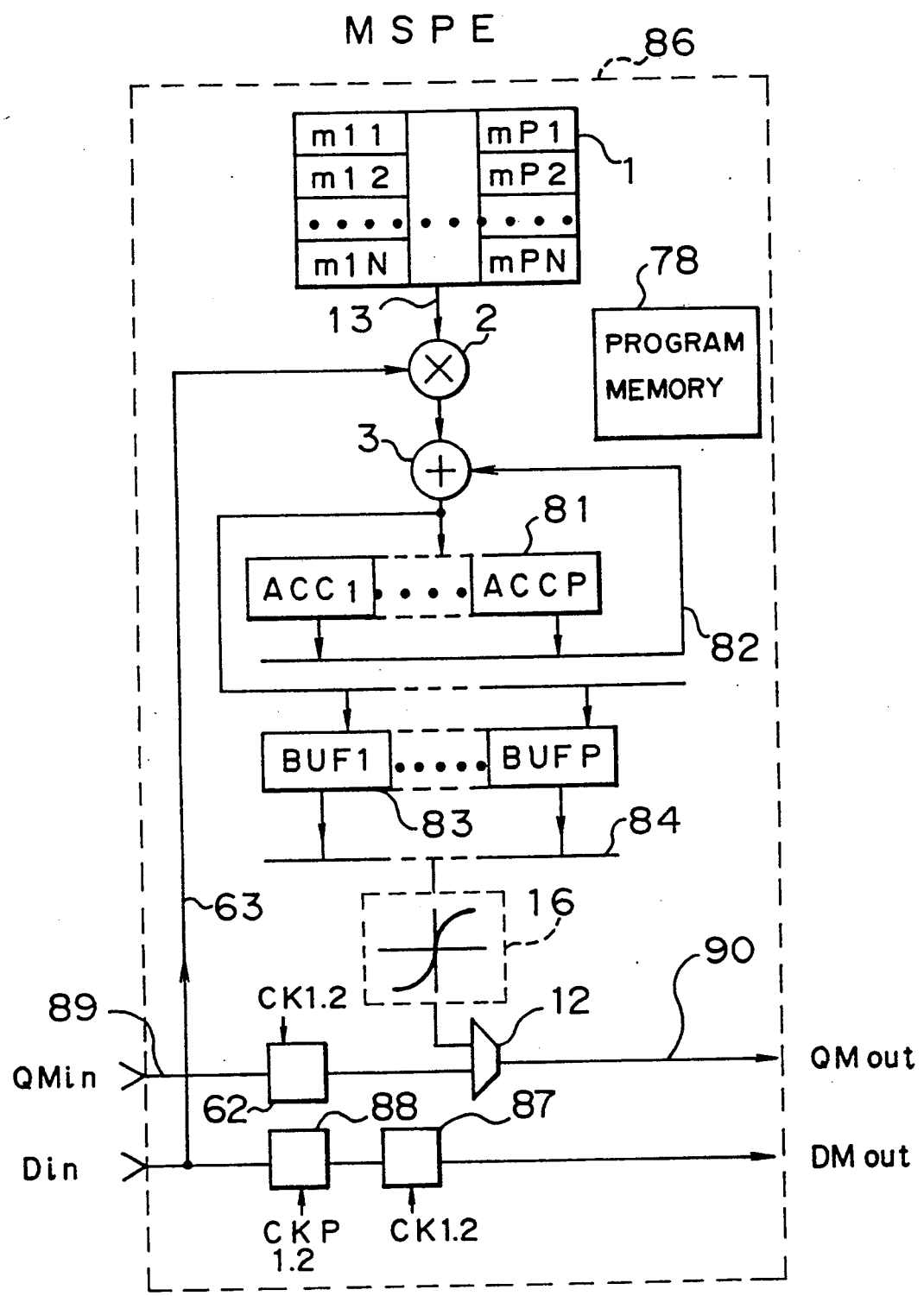
FIG. 18 shows a systolic processor element of the invention, for processing multiple neurons.

FIG. 18 shows an embodiment in which multiple neurons are processed by a single processor element as a way of further reducing the number of circuit elements, compared to the number used in the serial multiplier embodiment shown in FIG. 17. One multiple neuron SPE (hereinafter "MSPE") processes P neurons.

An MSPE consists of the coefficient memory 1 for storing the weight coefficients of P neurons, multiplier 2, adder 3 and, for each neuron, P accumulators 81, a P buffers array and the output data multiplexor 12.

In the embodiments so far, input data has been updated with X1, X2, ..., at each clock pulse, and weight coefficients mi1, mi2, ..., also have been updated accordingly, and the updated data has been multiplied with the coefficients and the results accumulated. In this embodiment, however, input data $X_j$ is fixed for the space of P clocks during which time the weight coefficient $mij (1 \leq j \leq P)$ of P neurons are updated at each clock and the multiplication $mij * Xj (1 \leq j \leq P)$ of P neurons is executed and the results for P neurons accumulated.

Figure 19:
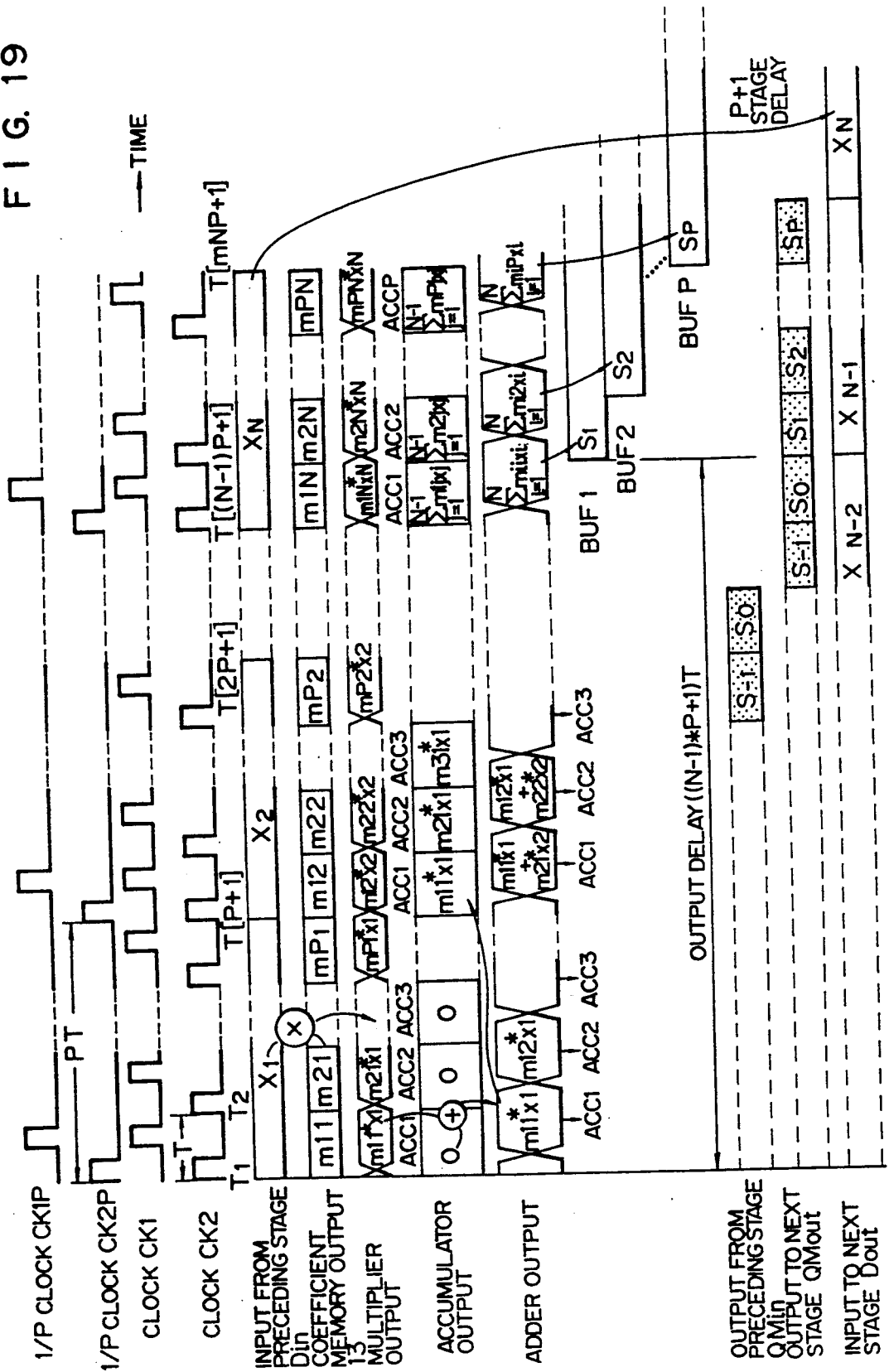
FIG. 19 is a timing diagram of the systolic processor element for processing multiple neurons.

FIG. 19 is the timing diagram for the above circuit. Input data $\{Xj\}$ is input at a rate PT (T being the clock frequency), while weight coefficients mij are read out at a frequency T. This operation will now be described with reference to FIG. 19. From Ti to T[P+1], data X1 from the preceding stage is input continuously. During this time the first coefficient m11 of the first neuron is read out of coefficient memory 13 at time T1 and is multiplied with input data X1 by the multiplier 2. The accumulation result m11 * X1 and the output 0 of the first neuron accumulator ACCl are added together by the adder 3 and the result m11 * X1 is again stored in the accumulator ACC1. As the accumulator 81 is a master-slave type driven by the same two-phase clock as in FIG. 1 the addition result can be latched by the clock CK1 while the output is being held.

With X1 held as the input data, the first coefficient m21 of the second neuron is read out at time T2 and is multiplied with input data X1 by the multiplier 2. The accumulation result m21 * X1 and the output 0 of the first neuron accumulator ACC2 are added together by the adder 3 and the result m21 * X1 is again stored in the accumulator ACC2. Thus, the multiply-accumulate processing of P neurons is performed while the input data X1 is held for a period PT.

From T[P+1], input data X2 is held while weight coefficient $mi2(1 \leq j \leq P)$ is updated with each clock, and each result $mi2 * X2(1 \leq j \leq P)$ is obtained from the multiplier 2.

The multiplication result mi2 * X2 and the corresponding mi1 * X1 of the accumulator $ACCi(1 \leq j \leq P)$ are added by the adder 3 and the result is accumulated in the primary stage of the same accumulator ACCi.

Continuing, from T[(N−1)P+1] the final input data XN is input continuously during the space of P clocks. From the same time the final coefficient $min(1 \leq j \leq P)$ of the first neuron is read out in sequence and is multiplied with input data XN by the multiplier 2. The multiplication result $miN * XN(1 \leq j \leq P)$ and the output $$\sum_{j=1}^{N-1} mij * Xj$$

of the ith neuron accumulator ACCi($1 \leq j \leq P$) are added by the adder 3 and the adder output $$Si = \sum_{j=1}^{N} mij * Xj$$

is stored in the output buffer BUFi of the ith neuron. The said buffer outputs the multiply-accumulate result Si of the ith neuron to the output terminal QMout of the next stage, via the output data multiplexor 12.

In one MSPE the delay between the input of data N and the point at which the first multiply-accumulate output Si is $\{(N-1)P+1\}T$. Input data Din is delayed for P clocks by latch 88 in accordance with clock CKP, which is 1/P clock CK, and by one stage by the latch 87 in accordance with clock CK. Therefore if the clock CK period is T (seconds), the delay will be $(P+1)T$ seconds. Output data QMin is given a delay of one stage by latch 62 in accordance with the normal clock CK.

When P is sufficiently large, it is feasible to provide each MSPE with a sigmoid function look-up table 16, as the MSPE circuit is not very large, in overall terms. (Such a configuration is indicated in the drawing by the broken line.)

Figure 20:
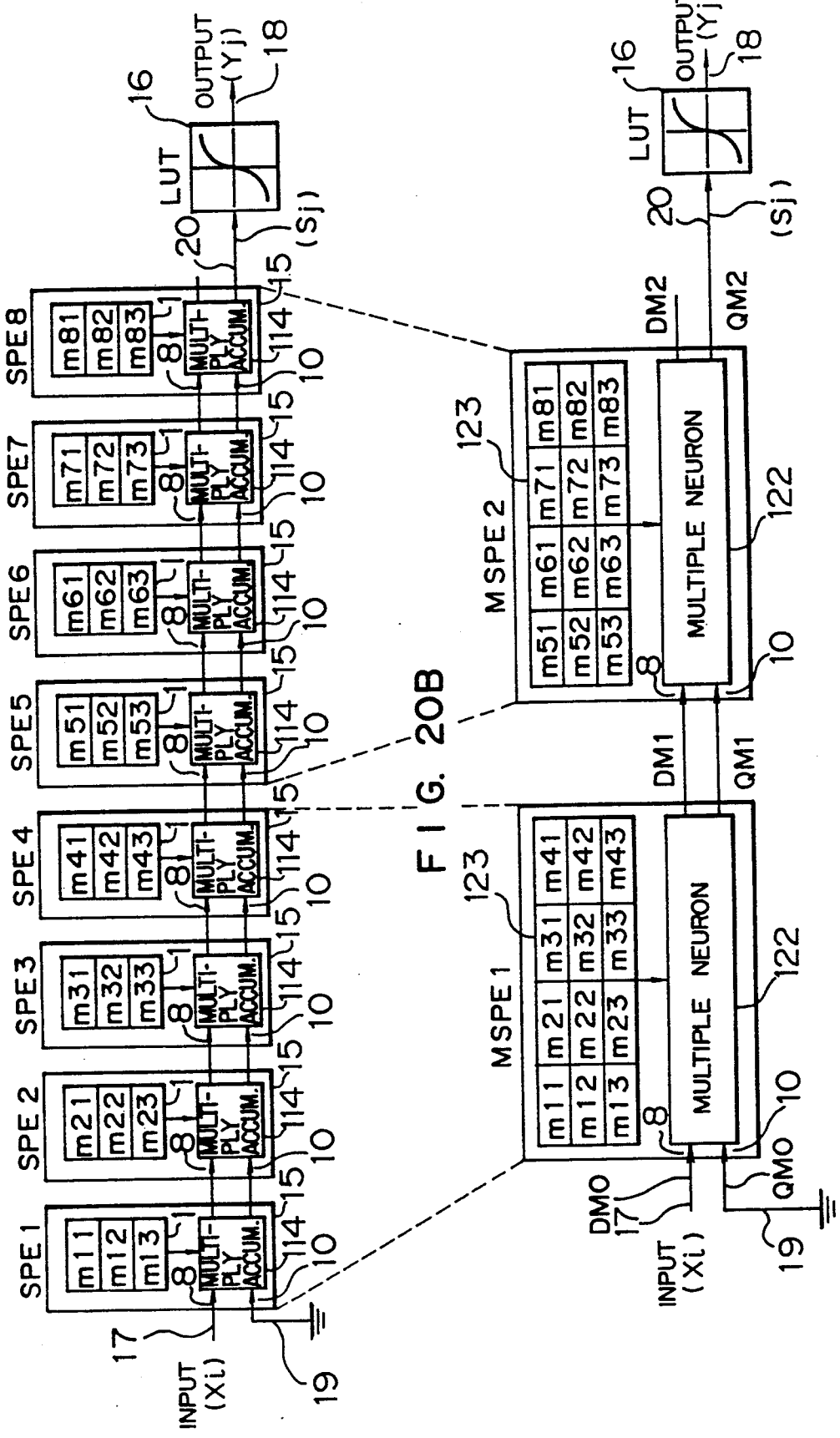
FIG. 20A and 20B show a single layer neural net formed using the systolic processor element for processing multiple neurons.
Figure 21:
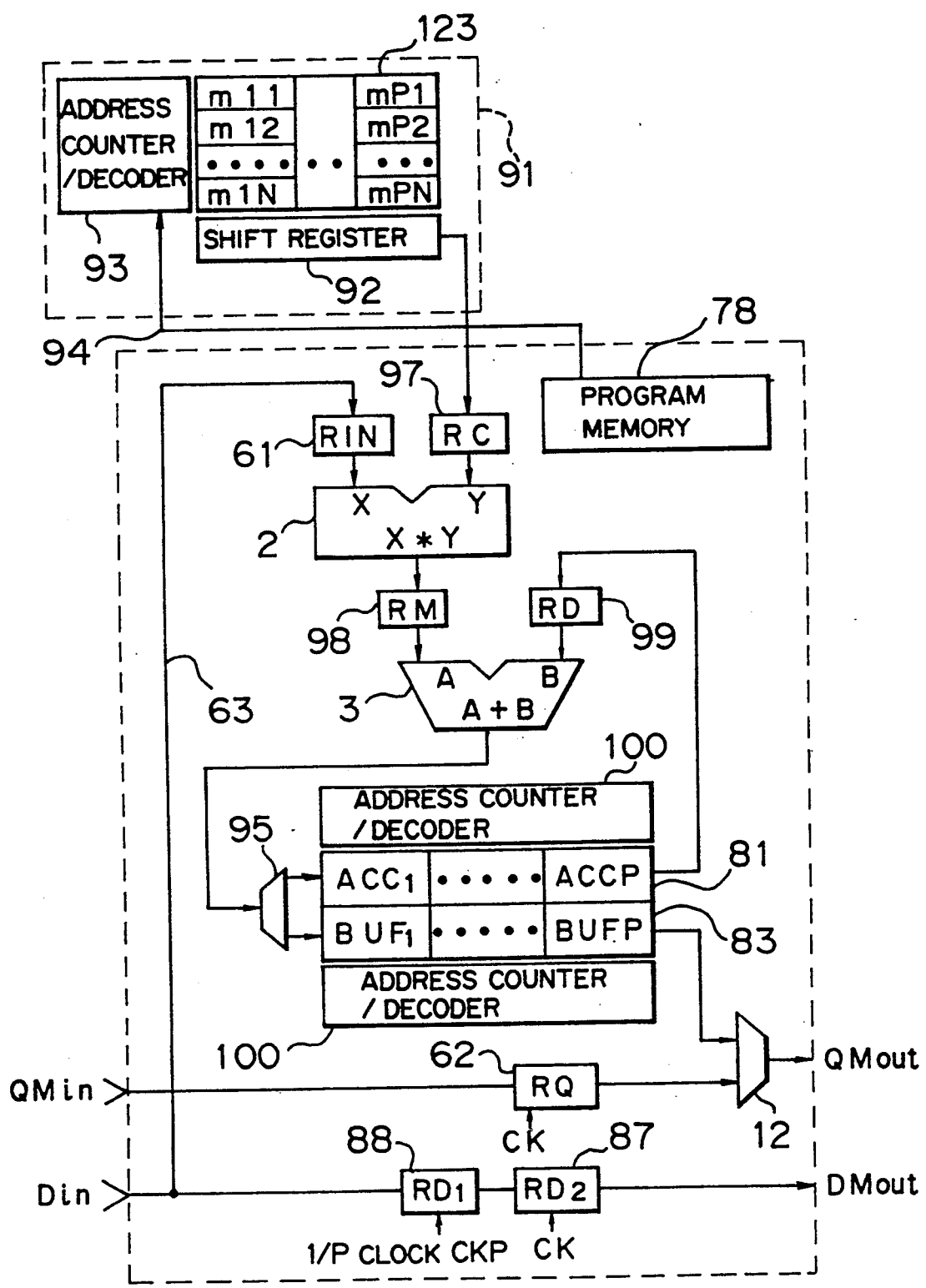
FIG. 21 shows an embodiment of a circuit formed using the systolic processor element for processing multiple neurons.

FIG. 20A shows a neural net formed by linking eight of the SPEs shown in FIG. 1. In the arrangement shown in FIG. 20B, there are configured as two processors of four neurons each. Here, the elements of FIG. 18 are used with $P=4$; that is, one processor processes four neurons. FIG. 21 shows one embodiment of the circuit of the processor element illustrated in FIG. 18.

A large memory capacity is needed to handle multiple neurons. If the number of data element inputs to one neuron is $N=10,000$, one MSPE processes 100 neurons and the coefficients use 8-bit precision, eight megabits of memory would be required. Also required is high speed coefficient read-out using a clock CK that has a cycle period T (several tens of nanoseconds).

Because of this, it is preferable to use a high speed external coefficient memory 91 that incorporates an output register 92, as shown in the drawing. In the output register 92 coefficient data is moved in parallel, one line's worth (P neurons) at a time, with high speed serial read-out. As the data are read out in sequence, so random access capability is not necessary, access is by means of an address/decoder 93.

The output of the adder 3 is sent to the accumulator 81 and the buffer 83 by the multiplexor 95. During accumulation (multiply-accumulation) the output is sent to the accumulator 81, and just the end result is sent to the buffer 83. The control program is stored in program memory 78.

Figure 22:
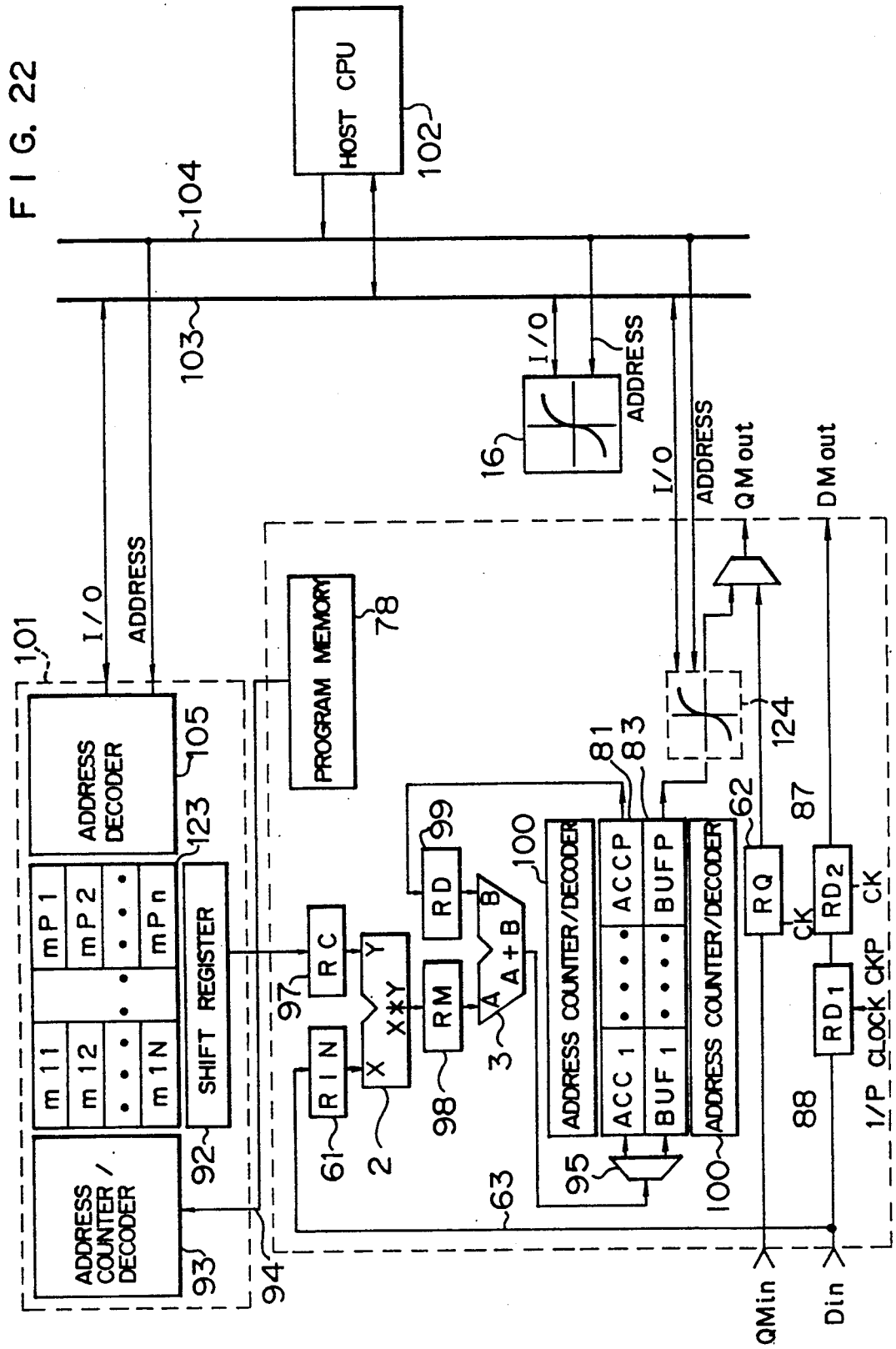
FIG. 22 shows an embodiment of a systolic processor element circuit which facilitates the programming of coefficient memories and sigmoid look-up tables.

An embodiment providing enhanced programmability will now be described with reference to FIG. 22. To facilitate the rewriting of coefficients, each SPE coefficient memory 101 can be randomly accessed by the host CPU 102. To enable this random access, the memory 101 is a dual port type with an internal address decoder 105. The address from the host CPU 102 is communicated to the address decoder 105 via a host address bus 104, and data is transferred to the memory 101 via data address bus 103. This makes it possible to access only those coefficients or coefficient blocks that need to be updated, and thus enables neural net coefficients to be readily updated.

In addition, making it possible for the host CPU 102 to randomly access the sigmoid function look-up table 16 of each neural net layer, or the sigmoid function look-up table 124 with a built-in processor, increases the flexibility of the net. The above means can be adapted to the circuit of FIG. 1.

The final systolic array embodiment to be described is one for a fault-tolerant neural net. Fault tolerance is particularly important in a neural net formed using a systolic array. In the type of conventional neural nets shown in FIG. 26 and FIG. 31 in which each neuron is connected with all other neurons, even if several wires are cut, coefficient reconstruction allows the neural net to continue to function. Also, with the learning ability of back-propagation neural nets, faulty connections can be bypassed automatically in the course of the coefficient adaption process.

However, when the systolic array according to the present invention is used, all information is communicated along just the two input data and output data lines, and these signals have to pass through the SPEs of each layer. Thus, a single faulty wire or processor element can stop the entire neural net. Fault recovery is essential if this is to be avoided.

Figure 23:
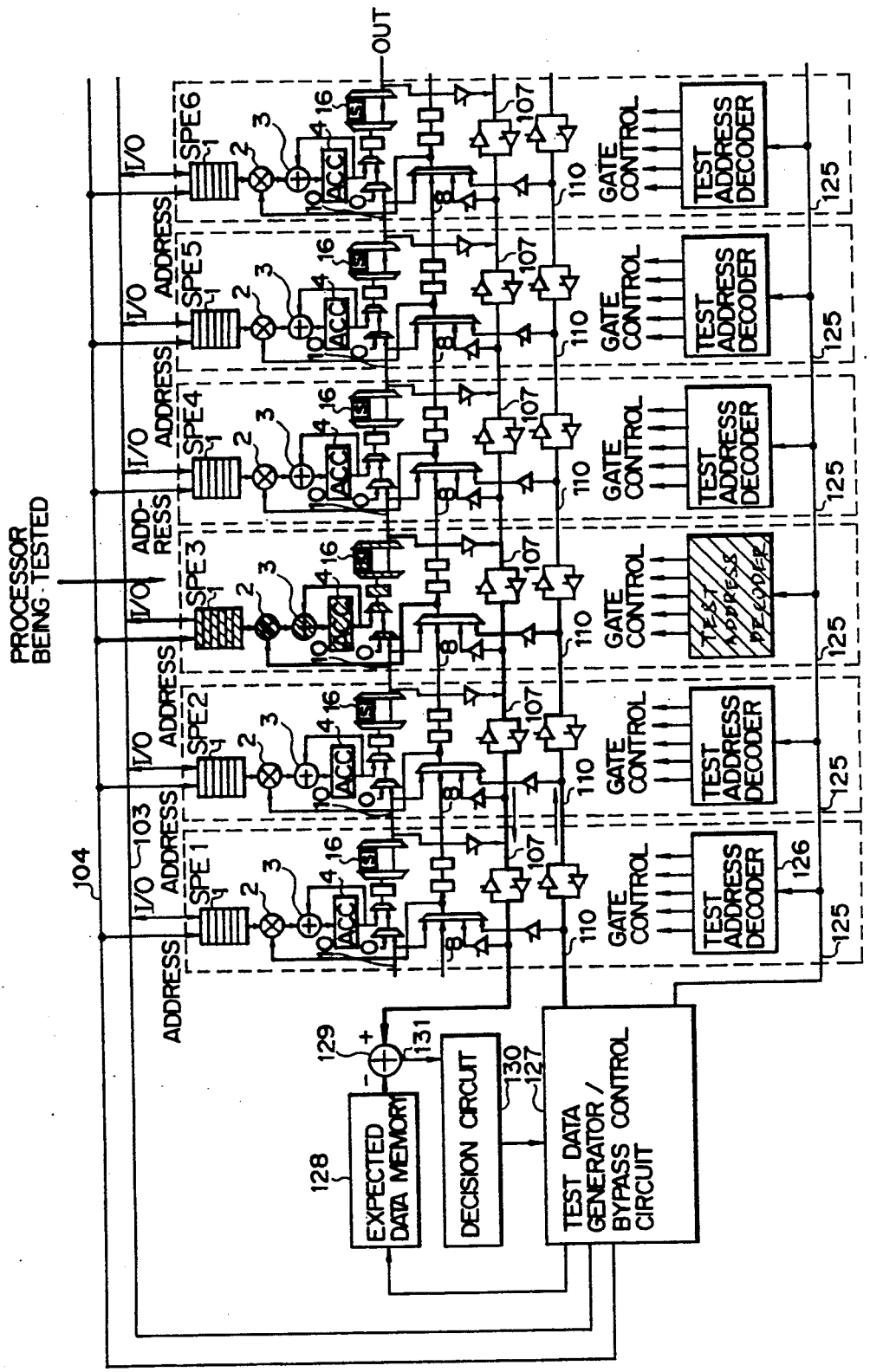
FIG. 23 is a circuit diagram of a circuit for detecting malfunctions in a systolic processor array according to the invention.
Figure 24:
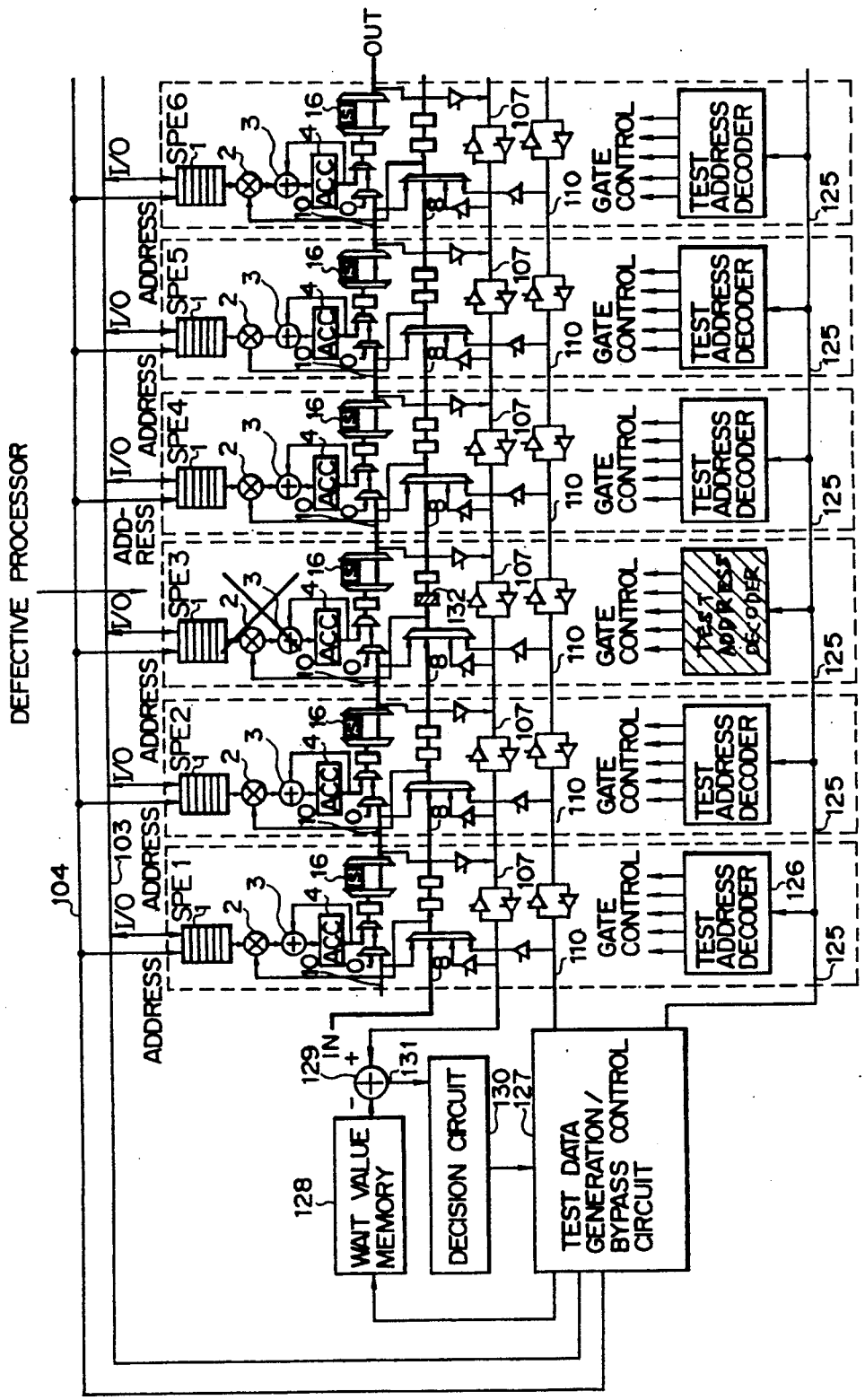
FIG. 24 is a circuit diagram showing the operation of the systolic processor element circuit arrangement for bypassing an element that has failed.

FIGS. 23 and 24 show a fault tolerant system. FIG. 23 illustrates a fault detection system and FIG. 24 a system for bypassing the faulty processor element. With reference to FIG. 23, a test data generator 127 sets specific data in the weight coefficient memory 1 of each element and inputs prescribed test data, via the local data input data bus 110, into the array from the left side. Assuming the element being tested is the third from the left, SPE3, as shown here, using the bus 110 the test data bypasses the first two elements SPE1 and SPE2.

The input data is processed in SPE3 and the result is output via the gate to the local data bus 107. What data is to be output by which processor element to the bus 107 is established by inputting an address via the test address bus 125, and decoding the address in the decoder 126 provided in each SPE. The test result is input into a comparator 129 and compared with data from an expected data memory 128, then passed to a decision circuit 130 for analysis, thus enabling a faulty processor element to be detected and bypassed.

FIG. 24 shows the system for bypassing a faulty processor element. It is assumed that it is the third element, SPE3, that is to be bypassed. The address of the SPE to be bypassed is sent via test address bus 125 and the bypass instruction is latched by the address decoder 126 of SPE3. A delay of one stage is applied to output data 10 from the preceding stage while preceding stage input data 8 has a two-stage delay (by latches 5 and 6 of FIGS. 1 and 13). To eliminate the imbalance between the delays, in this embodiment one of the latches 5 and 6 forms a through latch 132 to apply a further one-stage delay to the input data 8.

The result is that all data bypasses SPE3. The bypass control circuit 127 is able to issue bypass commands relating to multiple processor elements.

Thus, in accordance with the present invention, complex neural net interconnections can be realized by linking adjacent elements of systolic array processors. With this arrangement the only load on a neuron is that of the one adjacent element. With respect to large neural nets, this enables the load to be controlled and speeds up processing.

Unlike the conventional arrangement of reference (2), separate lines are used for input data and output data. This eliminates I/O data contention, enables continuous processing of high-speed signals such as video signals and gives the net a general-purpose flexibility free of restriction concerning the relationship between the number of input data elements N and the number of neurons M.

In accordance with this invention, multiply-accumulate processing of an input data series $\{Xj\}(1 \leq j \leq N)$ starts at the first-stage processor element and proceeds sequentially. The is no need for the feedback line used in the reference (2) example whereby data is transferred from the first stage element to the final stage element, and large neural nets can be formed without having to the synchronize processor elements at each end of the net.

In this invention, each layer of the neural net is provided with one sigmoid function look-up table which can be readily reprogrammed.

By adding sigmoid function look-up tables and a bypass circuit to bypass the table, a local data bus and a local input data bus, thereby forming general-purpose systolic arrays which can be adapted to form various types of neural net by programming.

The use of a multiplier-adder set for processing a plurality of neurons enables array configurations to be optimized in line with processing speed requirements and the size of the neural net.

Incorporating a test address bus and an address decoder in each processor element enables element faults to be detected. A through latch is used to eliminate an imbalance between input and output data delays and enable faulty elements to be bypassed.

What is claimed is:

1. A neural net signal processor provided with a single layer neural net including N neuron circuits, wherein N is any positive integer, which sum results of multiplication of each of N input signals $X_j(j=1$ to $N)$ by a coefficient $m_{ij}$ to produce a multiply-accumulate value $$S_i = \sum_{j=1}^{N} m_{ij} * X_j$$

thereof, in which input signals $X_j(j=1$ to $N)$ for input to the single layer neural net are input as serial input data, comprising:

a plurality of systolic processor elements $SPE_i(i=1$ to $M)$, wherein M is any positive integer, each systolic processor element including,
storage means for storing coefficients,
multiplying means for sequentially reading the coefficients from said storage means and sequentially multiplying each of the serial input data by an associated coefficient read out from said storage means,
means for summing the results of the multiplications from said multiplying means to produce a multiply-accumulated value $$S_i = \sum_{j=1}^{N} m_{ij} * X_j$$

a multiplexor for selectively outputting one of the multiply-accumulated values produced from said summing means and a multiply-accumulated value applied from a preceding systolic processor element,
first latch for delaying the multiply-accumulated value applied from said multiplexor by a first time period corresponding to an operation period by at least one systolic processor element and for applying the delayed multiply-accumulated value to a succeeding systolic processor element,
second latch for delaying the serial input data by a second time period longer than the first time period by an operation period by at least one systolic processor element and for applying the delayed multiply-accumulated value to the succeeding systolic processor element,
whereby the single layer neural net produces a serial multiply-accumulated value.

2. A neural net signal processor according to claim 1, further provided with a second single layer neural net similarly constituted of M2 processor elements, wherein M2 is any positive integer, and in which the serial output of the said single layer neural net is used as input to the second single layer neural net and a multiply-accumulate output is obtained from the second single layer neural net.

3. A neural net signal processor according to claim 1, further provided with P-1 serially connected single layer neural nets, wherein P is any positive integer, similarly constituted of M2 processor elements, wherein M2 is any positive integer, and in which the multiply-accumulate output of the n-1he single layer neural net element array is used as input to the nth second single layer neural net and the serial output of the p-1th layer neural net element array is used as input to the element array of the pth layer neural net, whereby ultimately a multiply-accumulate output is obtained from the Pth neural net.

4. A neural net signal processor according to claim 3, wherein the element array of any one layer of P single layer neural nets is provided with an input data multiplexor that selects between re-inputting data into the element array and inputting using fresh data.

5. A neural net signal processor according to claim 3, wherein the element array of any one layer of P single layer neural nets is divided into two or more blocks and output from each block is output sequentially to a local data bus by a tri-state gate means and transferred to the element array of the next neural net layer.

6. A neural net signal processor according to claim 1, wherein the single layer neural net is provided with an input data multiplexor that selects between reinputting data into the element array and inputting fresh data.

7. A neural net signal processor according to claim 6, wherein outputs $Y_j(j=1$ to $M)$ of the element array of the single layer neural net is input to the element array and an output is obtained therefrom.

8. A neural net signal processor according to claim 1, wherein the single layer neural net element array is divided into two or more blocks and output from each block is output sequentially to a local data bus by a tri-state gate means and transferred to the element array of the next neural net layer.

9. A neural net signal processor according to claim 1, wherein each processor element is further provided with a nonlinear function look-up table and a multiplexor set* that bypasses the nonlinear function look-up table; a local data bus for bypassing data; a local input data bus for bypassing input data; gate means for outputting a multiply-accumulate output to the local data bus; gate means for obtaining input data from the local data bus or local input data bus; a multiplexor for selecting data from a preceding stage, bypassed data or data that has been fed back; and a multiplexor for selecting a multiply-accumulate output from a preceding stage or a prescribed input.

10. A neural net signal processor according to claim 1, in which the adder and multiplexor of each systolic processor elements are constituted as a parallel adder and a parallel multiplexor.

11. A neural net signal processor according to claim 1, in which the adder and multiplier of the systolic processor elements are constituted as a parallel adder and a series multiplier that uses the parallel adder.

12. A neural net signal processor according to claim 1 for processing P neurons, wherein P is any positive integer, and wherein each of the systolic processor elements also contains for P neuron coefficients $m_{ij}$ (i = 1 to P, j = 1 to N); an input hold register; P accumulators; P buffer memories; and P shift registers.

13. A neural net signal processor according to claim 1, wherein a shift register is employed for high speed read-out of coefficient mij from the coefficient memory.

14. A neural net signal processor according to claim 13, wherein coefficients in the coefficient memory are adapted to be rewritten by a host processor via a separate readout port.

15. A neural net signal processor according to claim 1, wherein the contents of the nonlinear function look-up table memory in each systolic processor element are adapted to be rewritten by the host processor.

16. A neural net signal processor according to claim 1 in which each systolic processor element is provided with an output data gate; bypass delay latch; test address bus; test data bus and an address decoder; and a test data generator/bypass control circuit; comparator; extended data memory and decision circuit are provided outside the systolic array; thereby enabling faults to be detected and a faulty processor element to be bypassed.

17. In a single layer neural net having a plurality of systolic processor elements connected in series for summing results of multiplication of each of serial input data by an associated coefficient to produce a multiply-accumulate value, each of said systolic processor elements comprising:

storage means for storing coefficients;

multiply-accumulating means for sequentially reading the coefficients from said storage means and sequentially multiplying each of the serial input data by an associated coefficient read out from said storage means to sum the results of the multiplications to produce a multiply-accumulated value;

selection means for selectively outputting one of the multiply-accumulated value produced from said multiply-accumulating means and a multiply accumulated value applied from a preceding systolic processor element;

first delay means for delaying the multiply-accumulated value applied from said selection means by a first time period corresponding to an operation period by at least one systolic processor element and for applying the delayed multiply-accumulated value to a succeeding systolic processor element; and second delay means for delaying the serial input data by a second time period larger than the first time period by an operation period by at least one systolic processor element and for applying the delayed multiply-accumulated value to a succeeding systolic processor element.

* * * * *

UNITED STATES PATENT AND TRADEMARK OFFICE
CERTIFICATE OF CORRECTION

PATENT NO. : 5,091,864
DATED : February 25, 1992
INVENTOR(S) : Toru Baji, et al.

It is certified that error appears in the above-identified patent and that said Letters Patent is hereby corrected as shown below:

Claim 3, column 20, line 25, delete "n-lhe" and replace with --n-1th--.

Claim 3, column 20, line 27, delete "p-1th" and replace with --P-1th--.

Signed and Sealed this

Fourth Day of May, 1993

Attest:

MICHAEL K. KIRK

Attesting Officer

Acting Commissioner of Patents and Trademarks